US010444949B2

(12) United States Patent
Scott et al.

(10) Patent No.: US 10,444,949 B2
(45) Date of Patent: Oct. 15, 2019

(54) CONFIGURABLE USER DISPLAYS IN A PROCESS CONTROL SYSTEM

(71) Applicant: FISHER-ROSEMOUNT SYSTEMS, INC., Round Rock, TX (US)

(72) Inventors: Cindy Alsup Scott, Georgetown, TX (US); Paul Kenneth Daly, Cedar Park, TX (US); Hoa Van Lai, Austin, TX (US); Deeann Gates Del Guzzi, Pflugerville, TX (US); Stephen Gerard Hammack, Austin, TX (US); Larry Oscar Jundt, Round Rock, TX (US); Molly Marie Firkins, Cedar Park, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 58 days.

(21) Appl. No.: 14/048,844

(22) Filed: Oct. 8, 2013

(65) Prior Publication Data
US 2014/0108985 A1    Apr. 17, 2014

Related U.S. Application Data

(60) Provisional application No. 61/711,105, filed on Oct. 8, 2012, provisional application No. 61/711,110, filed on Oct. 8, 2012.

(51) Int. Cl.
*G06F 3/0484* (2013.01)
*G05B 15/02* (2006.01)
*G05B 19/418* (2006.01)

(52) U.S. Cl.
CPC .......... *G06F 3/0484* (2013.01); *G05B 15/02* (2013.01); *G05B 19/4188* (2013.01);
(Continued)

(58) Field of Classification Search
CPC ................ G05B 15/02; G05B 19/0426; G05B 19/41845; G05B 19/4188;
(Continued)

(56) References Cited

U.S. PATENT DOCUMENTS 5,241,624 A    8/1993   Torres
5,564,007 A    10/1996  Kazen-Goudarzi et al.
(Continued)

FOREIGN PATENT DOCUMENTS

CN    1702582 A    11/2005
CN    1716137 A    1/2006
(Continued)

OTHER PUBLICATIONS

Search Report for Application No. GB1521910.8, dated Jun. 2, 2016.
(Continued)

*Primary Examiner* — Daniel Samwel
(74) *Attorney, Agent, or Firm* — Marshall, Gerstein & Borun LLP

(57) ABSTRACT

A display configuration system enables plant operators to create their own process displays called dashboards during run-time of the plant and in the same interface that these operators use to view operation of the process plant. This display configuration system makes the operators more productive because the operators can quickly create and implement their own specialized dashboards, as these operators determine these dashboards are needed. Each dashboard has a defined layout specifying locations or regions at which display elements can be shown in the dashboard, and this layout is operator modifiable. Operators can easily create content on their own dashboards using predefined but configurable display building blocks called gadgets, which can be pre-stored in a library and can be made available for the
(Continued)

operator during dashboard creation activities. A gadget can be dragged and dropped onto a dashboard at one of the regions or locations of the dashboard to be installed in that region or location of the dashboard. The display configuration system may automatically size the gadgets based on the selected dashboard layout, and operators can modify an existing dashboard by adding, modifying, moving, minimizing or deleting gadgets on the dashboard.

39 Claims, 21 Drawing Sheets

(52) U.S. Cl.
CPC .............. *G05B 2219/25067* (2013.01); *G05B 2219/31418* (2013.01); *G05B 2219/31467* (2013.01); *G05B 2219/31472* (2013.01); *G05B 2219/32128* (2013.01); *Y02P 90/16* (2015.11); *Y02P 90/18* (2015.11); *Y02P 90/22* (2015.11); *Y02P 90/24* (2015.11)

(58) Field of Classification Search
CPC ........... G05B 2219/25067; G05B 2219/31418; G05B 2219/31467; G05B 2219/31472; G05B 2219/32128; G06F 8/71; G06F 3/0484; Y02P 90/16; Y02P 90/18; Y02P 90/22; Y02P 90/24
See application file for complete search history.

(56) References Cited

U.S. PATENT DOCUMENTS

| | | | | |
|---|---|---|---|---|
| 5,777,616 A * | 7/1998 | Bates | ................. | G06F 3/0486 715/837 |
| 5,812,394 A | 9/1998 | Lewis et al. | | |
| 5,950,201 A * | 9/1999 | Van Huben | ............. | G06F 17/50 |
| 6,014,612 A | 1/2000 | Larson et al. | | |
| 6,211,877 B1 * | 4/2001 | Steele | ...................... | G06F 9/542 715/205 |
| 6,282,175 B1 * | 8/2001 | Steele | ................. | G06F 11/0709 370/254 |
| 6,577,323 B1 | 6/2003 | Jamieson et al. | | |
| 6,839,852 B1 * | 1/2005 | Pantuso | .................. | H04L 41/06 380/258 |
| 6,942,143 B1 * | 9/2005 | Iida | ................... | G06F 17/30058 235/375 |
| 6,975,966 B2 * | 12/2005 | Scott | ................. | G05B 23/0272 700/4 |
| 7,010,450 B2 | 3/2006 | Law et al. | | |
| 7,030,747 B2 * | 4/2006 | Scott | .................... | G05B 23/027 340/506 |
| 7,043,311 B2 | 5/2006 | Nixon et al. | | |
| 7,089,530 B1 | 8/2006 | Dardinski et al. | | |
| 7,110,835 B2 | 9/2006 | Blevins et al. | | |
| 7,117,052 B2 | 10/2006 | Lucas et al. | | |
| 7,146,231 B2 | 12/2006 | Schleiss et al. | | |
| 7,237,109 B2 * | 6/2007 | Scott | .................... | G05B 19/042 713/164 |
| 7,272,815 B1 | 9/2007 | Eldridge et al. | | |
| 7,330,768 B2 * | 2/2008 | Scott | .................... | G05B 23/027 700/21 |
| 7,389,204 B2 | 6/2008 | Eryurek et al. | | |
| 7,421,458 B1 | 9/2008 | Taylor et al. | | |
| 7,526,347 B2 | 4/2009 | Lucas et al. | | |
| 7,647,126 B2 | 1/2010 | Blevins et al. | | |
| 7,680,546 B2 | 3/2010 | Gilbert et al. | | |
| 7,729,789 B2 | 6/2010 | Blevins et al. | | |
| 7,783,370 B2 | 8/2010 | Nixon et al. | | |
| 7,890,927 B2 | 2/2011 | Eldridge et al. | | |
| 7,904,821 B1 * | 3/2011 | Tertitski | ................ | G06F 3/0481 715/762 |
| 7,984,420 B2 | 7/2011 | Eldridge et al. | | |
| 8,028,272 B2 | 9/2011 | Eldridge et al. | | |
| 8,028,275 B2 | 9/2011 | Eldridge et al. | | |
| 8,060,222 B2 | 11/2011 | Eldridge et al. | | |
| 8,065,202 B1 * | 11/2011 | Ballaro | ................ | G06Q 10/087 705/27.2 |
| 8,127,060 B2 | 2/2012 | Doll et al. | | |
| 8,225,271 B2 | 7/2012 | Eldridge et al. | | |
| 8,229,579 B2 | 7/2012 | Eldridge et al. | | |
| 8,473,917 B2 | 6/2013 | Weatherhead et al. | | |
| 9,043,003 B2 | 5/2015 | Campney et al. | | |
| 9,164,647 B2 | 10/2015 | Ueno et al. | | |
| 2002/0161772 A1 * | 10/2002 | Bergelson | ............. | G06Q 10/10 |
| 2003/0236576 A1 | 12/2003 | Resnick et al. | | |
| 2004/0075689 A1 | 4/2004 | Schleiss et al. | | |
| 2004/0153804 A1 | 8/2004 | Blevins et al. | | |
| 2004/0186927 A1 | 9/2004 | Eryurek et al. | | |
| 2004/0201602 A1 | 10/2004 | Mody et al. | | |
| 2004/0260408 A1 * | 12/2004 | Scott | .................... | G05B 23/027 700/20 |
| 2005/0027376 A1 | 2/2005 | Lucas et al. | | |
| 2005/0027377 A1 | 2/2005 | Lucas et al. | | |
| 2005/0096872 A1 | 5/2005 | Blevins et al. | | |
| 2005/0125787 A1 * | 6/2005 | Tertitski | ................ | G06F 9/4443 717/162 |
| 2005/0251380 A1 * | 11/2005 | Calvert | .................... | G06F 8/38 703/22 |
| 2006/0015195 A1 | 1/2006 | Lehman et al. | | |
| 2006/0071067 A1 * | 4/2006 | Iida | ................... | G06F 17/30017 235/382 |
| 2006/0117268 A1 * | 6/2006 | Talley | .................... | G06F 17/212 715/769 |
| 2007/0005266 A1 | 1/2007 | Blevins et al. | | |
| 2007/0132779 A1 | 6/2007 | Gilbert et al. | | |
| 2007/0139441 A1 * | 6/2007 | Lucas | ................ | G05B 19/0426 345/619 |
| 2007/0150081 A1 * | 6/2007 | Nixon | .................... | G06F 9/4488 700/83 |
| 2007/0156264 A1 | 7/2007 | Schleiss et al. | | |
| 2007/0165031 A1 | 7/2007 | Gilbert et al. | | |
| 2007/0168060 A1 | 7/2007 | Nixon et al. | | |
| 2007/0168065 A1 | 7/2007 | Nixon et al. | | |
| 2007/0171921 A1 * | 7/2007 | Wookey | ................. | G06F 3/1415 370/401 |
| 2007/0174225 A1 | 7/2007 | Blevins et al. | | |
| 2007/0208549 A1 | 9/2007 | Blevins et al. | | |
| 2008/0066004 A1 | 3/2008 | Blevins et al. | | |
| 2009/0024656 A1 | 1/2009 | Wellman | | |
| 2009/0088875 A1 | 4/2009 | Baier et al. | | |
| 2009/0132996 A1 | 5/2009 | Eldridge et al. | | |
| 2010/0017746 A1 | 1/2010 | Husoy et al. | | |
| 2010/0082554 A1 | 4/2010 | Beatty et al. | | |
| 2010/0168874 A1 | 7/2010 | Lucas et al. | | |
| 2010/0188410 A1 | 7/2010 | Gilbert et al. | | |
| 2010/0191554 A1 | 7/2010 | Singh et al. | | |
| 2010/0222899 A1 | 9/2010 | Blevins et al. | | |
| 2010/0228373 A1 | 9/2010 | Lucas et al. | | |
| 2011/0016099 A1 | 1/2011 | Peer et al. | | |
| 2011/0029102 A1 * | 2/2011 | Campney | ............... | G05B 15/02 700/83 |
| 2011/0230980 A1 | 9/2011 | Hammack et al. | | |
| 2012/0029661 A1 | 2/2012 | Jones et al. | | |
| 2012/0030089 A1 * | 2/2012 | Ram | .................. | G06Q 30/0222 705/37 |
| 2012/0041570 A1 | 2/2012 | Jones et al. | | |
| 2012/0198547 A1 * | 8/2012 | Fredette | ..................... | G06F 8/34 726/19 |
| 2012/0215464 A1 | 8/2012 | Daubney | | |
| 2013/0125007 A1 * | 5/2013 | Chaudhri | ............. | G06F 3/0481 715/738 |
| 2013/0145279 A1 * | 6/2013 | Ricci | ......................... | G06F 9/54 715/746 |
| 2013/0145297 A1 * | 6/2013 | Ricci | ......................... | G06F 9/54 715/765 |
| 2013/0346908 A1 | 12/2013 | Zhang | | |
| 2014/0075371 A1 | 3/2014 | Carmi | | |
| 2014/0088776 A1 | 3/2014 | Brandt et al. | | |
| 2014/0100668 A1 * | 4/2014 | Jundt | ....................... | G06F 3/0484 700/11 |

(56) References Cited

U.S. PATENT DOCUMENTS

| | | | | |
|---|---|---|---|---|
| 2014/0100669 A1* | 4/2014 | Hammack | ............ | G06F 3/0484 700/17 |
| 2014/0100676 A1* | 4/2014 | Scott | .................... | G06F 3/0484 700/83 |
| 2014/0108985 A1* | 4/2014 | Scott | .................... | G06F 3/0484 715/771 |
| 2014/0250420 A1 | 9/2014 | Smith et al. | | |
| 2015/0105878 A1* | 4/2015 | Jones | ................. | G06F 9/44505 700/83 |
| 2015/0106753 A1 | 4/2015 | Tran et al. | | |

FOREIGN PATENT DOCUMENTS

| | | | |
|---|---|---|---|
| CN | 1950761 | A | 4/2007 |
| CN | 1950771 | A | 4/2007 |
| CN | 101095131 | A | 12/2007 |
| CN | 102013045 | A | 4/2011 |
| EP | 2 482 186 | A1 | 8/2012 |
| EP | 2 608 025 | A1 | 6/2013 |
| EP | 2 801 941 | A1 | 11/2014 |
| GB | 2 398 659 | A | 8/2004 |
| JP | 02-208693 | A | 8/1990 |
| JP | 11-282655 | A | 10/1999 |
| JP | 2000-222184 | A | 8/2000 |
| JP | 2004-85243 | A | 3/2004 |
| JP | 2005-339494 | A | 12/2005 |
| JP | 2007-157039 | A | 6/2007 |
| JP | 2007-536648 | A | 12/2007 |
| JP | 2012-73993 | A | 4/2012 |
| JP | 2012-103978 | A | 5/2012 |

OTHER PUBLICATIONS

International Preliminary Report on Patentability for Application No. PCT/US2013/063914, dated Apr. 8, 2015.
International Preliminary Report on Patentability for Application No. PCT/US2013/063894, dated Apr. 8, 2015.
Examination Report for Application No. GB1505495.0, dated Sep. 28, 2016.
Office Action for Chinese Application No. 201380063079.6, dated Sep. 1, 2016.
International Search Report and Written Opinion for Application No. PCT/US2013/063894, dated Jan. 7, 2014.
International Search Report and Written Opinion for Application No. PCT/US2013/063914, dated Jan. 22, 2014.
Office Action for Chinese Application No. 201380063079.6, dated Jan. 23, 2017.
Office Action for Chinese Application No. 201380064166.3, dated May 2, 2017.
Office Action for Chinese Application No. 201380064166.3, dated Sep. 7, 2016.
Notice of Reasons for Rejection for Japanese Application No. 2015-536840, dated Jan. 9, 2018.
Office Action for Chinese Application No. 201380063079.6, dated Aug. 2, 2017.
Office Action for Chinese Application No. 201380063079.6, dated Oct. 30, 2017.
Examination Report for Application No. GB1505494.3, dated Jan. 29, 2019.
Extended European Search Report for Application No. 18187614.5, dated Jan. 18, 2019.
Notice of Reasons for Rejection for Japanese Application No. 2015-536843, dated Jan. 9, 2018.
Office Action for Chinese Application No. 201611003855.5, dated Nov. 27, 2018.
Examination Report for Application No. GB1505495.0, dated Sep. 30, 2015.
Decision of Dismissal of Amendment for Japanese Application No. 2015-536840, dated Jun. 4, 2019.
Notification of First Office Action for Chinese Application No. 201510947366.4, dated Jun. 21, 2019.

* cited by examiner

CONFIGURABLE USER DISPLAYS IN A PROCESS CONTROL SYSTEM

RELATED APPLICATIONS

This application claims the benefit for priority purposes of U.S. Provisional Application No. 61/711,105 entitled "Configurable User Displays in a Process Control System" and filed on Oct. 8, 2012, the entire contents of which are hereby incorporated by reference herein. Additionally, this application claims the benefit for priority purposes of U.S. Provisional Application No. 61/711,110 entitled "Process Plant Configurations Using Flexible Objects" and filed on Oct. 8, 2012, the entire contents of which are hereby incorporated by reference herein.

FIELD OF THE INVENTION

The present invention relates generally to process control systems and, in more particularly, to providing a flexible or configurable user interface environment for enabling the creation and configuration of process plant displays.

BACKGROUND

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Intelligent (or "smart") field devices, such as the field devices conforming to the well-known Fieldbus protocols, like the FOUNDATION® Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules that make process control decisions, generate control signals based on the received information and coordinate with the control modules or blocks being executed in the field devices, such as HART® and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices execute applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process network that may be located at a single facility or networked across several facilities or process control plants. A configuration application, which resides in one or more operator workstations, enables users to create or change process control modules and download these process control modules via a data highway to dedicated distributed controllers. Typically, these control modules are made up of communicatively interconnected function blocks that are objects in an object oriented programming protocol and perform functions within the control scheme based on inputs thereto and provide outputs to other function blocks within the control scheme. The configuration application may also allow a designer to create or change operator interfaces or human-machine interfaces (HMIs) which are used by a viewing application to display data to an operator and to enable the operator to change settings, such as set points, within the process control routine. Each dedicated controller and, in some cases, one or more field devices, store and execute a controller application that runs the control modules assigned and downloaded thereto to implement actual process control functionality. The viewing applications, which may be executed on one or more operator workstations, receive data from the controller application via the data highway and display this data to process control system designers, operators, or users using the user interfaces, and may provide any of a number of different views, such as an operator's view, an engineer's view, a technician's view, a maintenance view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure, monitor, and use these applications. For example, graphical display applications have been used to support control configuration applications to enable a configuration engineer to graphically create control programs to be downloaded to the control devices within a process plant. Additionally, graphical display applications have been used to enable control operators to view the current process conditions of the process plant (or areas of the process plant), to supervise and manipulate process control functions, to monitor process-level alarms, etc. Other graphical display applications enable maintenance personnel to view the functioning state of hardware devices and various areas within the process plant, while yet other graphical display applications permit engineers to simulate the operation of the process plant.

A configuration engineer may use a graphical display creation application to create one or more displays for operators, maintenance personnel, etc., within the process plant by selecting and building display objects in the display creation application. These displays are typically implemented on a system-wide basis in one or more of the workstations and provide preconfigured displays to the operator and maintenance personnel regarding the operating state of the control system or the devices within the plant. In larger process plants, displays may be specific to a certain portion of the plant or a certain functional area. In general, the displays take the form of alarming displays that receive and display alarms generated by controllers or devices within the process plant, control displays indicating the operating state of the controllers and other devices within the process plant, maintenance displays indicating the functioning state of the devices within the process plant, etc. Further, these displays are typically preconfigured to display information or data received from the process control modules or the devices within the process plant. For example, a graphic on the display screen may change in real-time to illustrate that a tank is half full or that the position of a valve has changed, or a numerical indictor included in the graphic display may be updated according to the flow measured by a flow sensor or the temperature of a reactor.

Historically, real-time process control data to which displays had access was limited primarily to controllers. In other words, prior to the introduction of intelligence to field devices, configuration engineers did not develop displays capable of automatically displaying diagnostic or alarm data originated from field devices. Of course, intelligent field devices today are an important source of process control data, and retrieving, displaying, and applying information from intelligent field devices is instrumental in operating and diagnosing control operations in a process plant.

Although intelligent field devices have been available for a number of years, configuration engineers continue to face numerous challenges in efficiently incorporating information from such devices into displays. Configuration engineers typically dedicate a significant amount of time and effort to developing screens specific to process areas and operational tasks associated with these areas, and budget considerations often do not permit re-development (or even modification) of displays to accommodate new sources of information. Moreover, configuration engineers often develop displays separately from control strategies. At the time when a display is being developed for a particular control strategy, the configuration engineer may not yet know which devices the control strategy will use, or whether these devices will be intelligent. Many displays, some of which may be regarded as legacy displays, thus continue to have hard-coded process parameters and graphical components.

In many process plants, control strategies and field devices are typically represented as separate objects in a process control system. Control strategy objects and device objects have respective distinct tags, alarms, faceplates, and other attributes. Thus, with the introduction of intelligent field devices, the number of objects in a typical process control system has increased dramatically. Although these objects provide operators with a wealth of useful information, the number of such objects has increased the complexity of the tasks needed to be completed by operators and configuration engineers. Thus, many users must evaluate the impact of intelligent field devices on their existing work practices and possibly define new practices to effectively use these new sources of information. Some facilities accordingly have been reluctant to dedicate resources to redefine the existing practices, and instead have chosen to supervise process plant operations without the aid of information from intelligent field devices. In particular, these facilities continue to use displays that do not reflect diagnostic, alarm, and other process data available from intelligent field devices.

On the other hand, incorporation of information from intelligent field devices into displays sometimes has the undesired effect of frustrating users by the amount of detail and complexity of depicted information. For example, an object corresponding to a certain control strategy, along with objects corresponding to devices used by the control strategy, may provide an overwhelming amount of information that some users will perceive as noise. Moreover, displaying all of the available information on a display also creates undesired clutter, and further worsens user experience. It is thus common to logically group the available information under various user menu options.

In any event, as a result of these factors, the number and type of control and support applications used in a process control environment have increased, and in particular, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been separately created as part of the specific applications with which they are associated, and thus are generally limited in usefulness to the specific process function for which they were created. For example, it is difficult, if not impossible, to use a graphical program created to support a control operator in a context involving maintenance, configuration, or simulation functions.

Further, the existing applications typically require a large number of clicks of selections to reach a desired menu item in a display. In particular, operators or maintenance personnel interested in "drilling down" into a module often have to activate numerous menus, review and respond to multiple dialogues, etc. In many cases, controls for triggering tasks are not organized in an intuitive manner, and accordingly require a significant amount of time to master.

In another case, the ever-increasing number of command options and features continues to make process control design, configuration, and management more complex. A typical user often sees numerous controls and menu items on the screen whereas only a relatively small subset of these controls or menu items is applicable to the task the user performing.

During configuration, a display creation application may have template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to different users. To animate the graphic display, the display creator manually ties each of the graphical items to data generated within the process plant, such as data measured by sensors or indicative of valve positions, etc. by specifying a communication link between the graphic item and the relevant data source within the process plant. This process is tedious, time consuming and may be fraught with error and additionally requires significant programming knowledge and knowledge of the plant configuration. Moreover, once a display is created, it remains static in its configuration and layout and thus difficult, if not impossible to change.

Moreover, graphics are typically defined separately from the control strategies, and one graphics display may often be used with multiple different control modules. Because a wide variety of variations of graphics are expected in graphics displays, it is necessary to design a graphics configuration system, using special forms, that specifies which variations are to be allowed or enabled with override structures in each of the graphics displays. These variations include, for example, specifying changes such as allowing the user to define the rotation for part of the item, select what strings and variables must be shown in the display and which ones are optional, etc. Without this up front design, the graphic displays cannot even have small changes made thereto during run-time of the plant. Unfortunately, a configuration system that attempts to design or pre-specify the allowable changes in all graphics displays quickly becomes unusable, as variations on graphics items in a display is very common. As a result, maintaining graphics cost effectively is an ongoing problem within control systems, and is only exacerbated when the step of maintaining graphics must be coordinated with the changes being made to control module classes used in the control configuration system.

As an example, operator displays used to monitor and control process plants are defined in a programming environment, and once complete, are deployed for use by operators. If changes are required to a deployed display, the changes are implemented in the programming environment and the display is then redeployed. Although cumbersome, proper design of operator displays is critical to the safe operation of a process plant. Thus operators are not typically allowed to change the displays themselves. In addition, most operators do not have the training required to be able to program new displays.

However, as noted above, process graphics require lengthy and costly engineering time to configure. The displays are often designed based on the piping and instrument diagrams, ensuring that all of the measurements and controls are represented for the operator. While some displays may be programmed for known tasks such as plant startups and shutdowns, it is impractical to create one-off displays that serve all of the potential specific purposes expected to be performed by a particular user or to customize a display for particular task performed by a single user. Moreover, the creation of task specific displays requires collaboration between the engineers and operations personnel, which may not be practical during the configuration effort which is when the displays are being defined. If there is no display defined for a particular task, the operator must navigate across the displays that have the needed information, in order to properly monitor and operate the process. This operation is disruptive to the operator and can increase the risk of operator errors, due to needing to memorize the information on the other displays.

Moreover, the navigation activities that the operator uses to change between the displays available to the operator is typically programmed into the displays. While it is typical to program multiple direct display connections within the operator displays, these display connections also typically follow the piping and instrument diagrams of the plant which may not be the manner in which a particular operator needs to navigate between displays. In order to ensure that the operator can quickly access whatever displays are needed, these displays may provide or add numerous, such as 30 or more, display access points on a display that enable a user to easily access other displays. However, again, the user must be familiar enough with the display to be able to navigate quickly to the correct display to find the information the operator needs.

SUMMARY

A display configuration system enables operators to create their own process displays (referred to hereafter as "dashboards" or "dashboard displays") in the same interface that they use to operate the process plant and in a manner that does not require the users to understand the graphics programming application. Moreover, the display configuration system enables operators to make any number of dashboards, as needed for their tasks, and enables the operators to do so during run-time of the plant. Using this display configuration system, display configuration engineers are not required to create displays for all possible operator tasks, thereby reducing the display configuration activities needed in a plant. Moreover, plant operators can be more productive because they can quickly create and implement their own dashboards, as these operators determine these dashboards are needed.

Generally speaking, a dashboard is a type of display, with the unique capability that this dashboard allows modification by operators. Each dashboard has a defined layout, such as three columns and two rows, or a three by three grid, defining locations or regions at which display elements can be shown in the dashboard, and this layout may be operator modifiable. In one case, operators can easily create content on their own dashboards using predefined display building blocks (referred to hereafter as "gadgets"). The gadgets can be provided in a library and can be simply dragged and dropped onto a dashboard at one of the regions or locations of the dashboard to be installed in that region or location of the dashboard. In one embodiment, gadgets may be moved within the dashboard by selecting a title bar for the gadget and dragging and dropping the gadget to a new location in the dashboard. The display configuration system may automatically size the gadgets based on the selected dashboard layout. If desired, operators can modify an existing dashboard by adding, modifying, moving, minimizing or deleting gadgets on the dashboard.

If desired, security measures may be used to determine which operators are allowed to create and modify dashboards to ensure that only operators with the right process knowledge are allowed to create and modify dashboards. Still further, the gadgets may be configurable by the operator and may, for example, be preprogrammed with simple choices and options for the operator (referred to hereafter as "aliases"), to reduce or eliminate the special training or graphics knowledge required by the operator in developing a dashboard using gadgets. The inclusion of these choices and options allows for a single gadget to be reusable across a variety of process values, instead of being dedicated to a single set of process values.

Dashboards may be automatically saved in the configuration system and there may be little or no extra configuration actions required to make saved dashboards available for others to see. For example, operators may be able to view dashboards made by other operators, and use these saved dashboards as a starting point for creating their own dashboard. In one case, if a first user makes changes to the dashboard of another user, this changed dashboard may be automatically saved as a personal dashboard for the first user. Using this configuration system makes it easy for an operator to create a custom, modified copy of an existing dashboard on the system (a "system dashboard") or from the personal dashboards of other users. By modifying a system dashboard or another user's personal dashboard, the system automatically creates a copy for an operator to use as that operator's personal dashboard. If a dashboard is found to be useful for more than one individual, a personal dashboard can be promoted to a system dashboard at any time.

Upon log in to the plant network, operators may be provided with an interface that provides a list or set of dashboards that are likely to be useful to the operator. The system may, for example, automatically provide the operator with an initial set of "favorite" or personal dashboards and displays the first time the operator logs into the system. The operator may be able to manage these lists as the operator determines is most useful to that operator. Moreover, lists of dashboards and displays may be set up or established for certain tasks, such as plant start-up an shut-down tasks, for groups of users, for particular sections or regions of a plant, for particular equipment within the plant, etc.

Dashboards as described herein can also be created in the graphics programming application used by a configuration engineer during the initial configuration of a plant. This feature allows the display configuration engineer to create an initial set of dashboards for operators. If the engineer decides a dashboard should no longer be modified, the engineer can change the dashboard from a dashboard to a display (also called a system display). While the display looks the same to the operator, the display can now only be modified in the graphics programming application used by the configuration engineer and not the display application used by the operator.

An engineer can also define some parts of a dashboard as being not modifiable. For example, the engineer may allocate a portion of the dashboard for gadgets, with the rest of the dashboard being is programmed with standard graphics elements (e.g. circles and squares) that are not modifiable by the operator. The operator could then add, modify, rearrange and delete gadgets only within the allocated portion of the dashboard. Still further, the configuration engineer may create one or more gadgets to be later used by operators in creating dashboards. Typical display programming applications used by configuration engineers often provide a mechanism for the engineer to create a complex graphics visualization that is reusable in the editing environment, referred to hereafter to as a graphical element module (a GEM). However, in this case, the gadgets may also be created in the graphics programming application, and may simply be created as a GEM that is defined to be a gadget. GEMs and gadgets may thus use the same alias concept and, in this case, all of the graphics capabilities available to a GEM are available in a gadget. Thus, using these concepts, the engineer only needs to understand one application and programming approach for gadgets, displays and dashboards.

Display navigation in dashboards is improved by showing all of the displays available to the operator in an organized list, which may use folders to organize the displays. A folder might be used to define the displays relevant to a portion of the process plant to provide hierarchical navigation, such as utilities/boilers, or might be used to define the displays used for a particular task, such as a plant shutdown. A display can be shown in multiple folders, so that the display is easily accessible for a variety of tasks as well as by a portion of the plant. Because there are often several hundred displays in a control system, the display configuration system enables operators to organize the displays these operators use most commonly into their own list of favorite displays. A favorites list may also uses folders to organize the displays, allowing a display to be referenced in multiple folders. As a result, the operators do not have to rely on engineers to have programmed all of the display navigation connections needed to optimally perform the operator tasks.

If desired, dashboards may be treated like any other display within the operations application for navigation, with the addition that the dashboards of a particular user or operator may be automatically or manually organized to make these dashboards easy to find for that operator, by for example, being available or shown in the user's folder and by being automatically added to the user's list of favorite displays.

Still further, to aid navigation, the displays or dashboards may also have programmed display navigation tools for moving to a next, previous, up and down display in a display hierarchy and these "next" or adjacent displays in the hierarchy may be dashboards or system displays. If the operator who is currently logged on has created his or her own personal dashboard from the referenced dashboard, the control system may automatically access that user's personal dashboard for display to the user instead of the referenced dashboard or display in response to the navigation commands of the user. If the operator has not created his or her own personal dashboard, the system defined dashboard can be accessed instead.

If desired, the display configuration system and the operational interfaces described herein may be available in either a rich desktop or a web interface environment. In particular, the display viewing and generation capabilities described herein may be performed in a web browser environment in which the system enables a user to browse through pre-stored or pre-created displays instead of web pages, by searching and viewing displays, etc.

DETAILED DESCRIPTION

Figure 1:
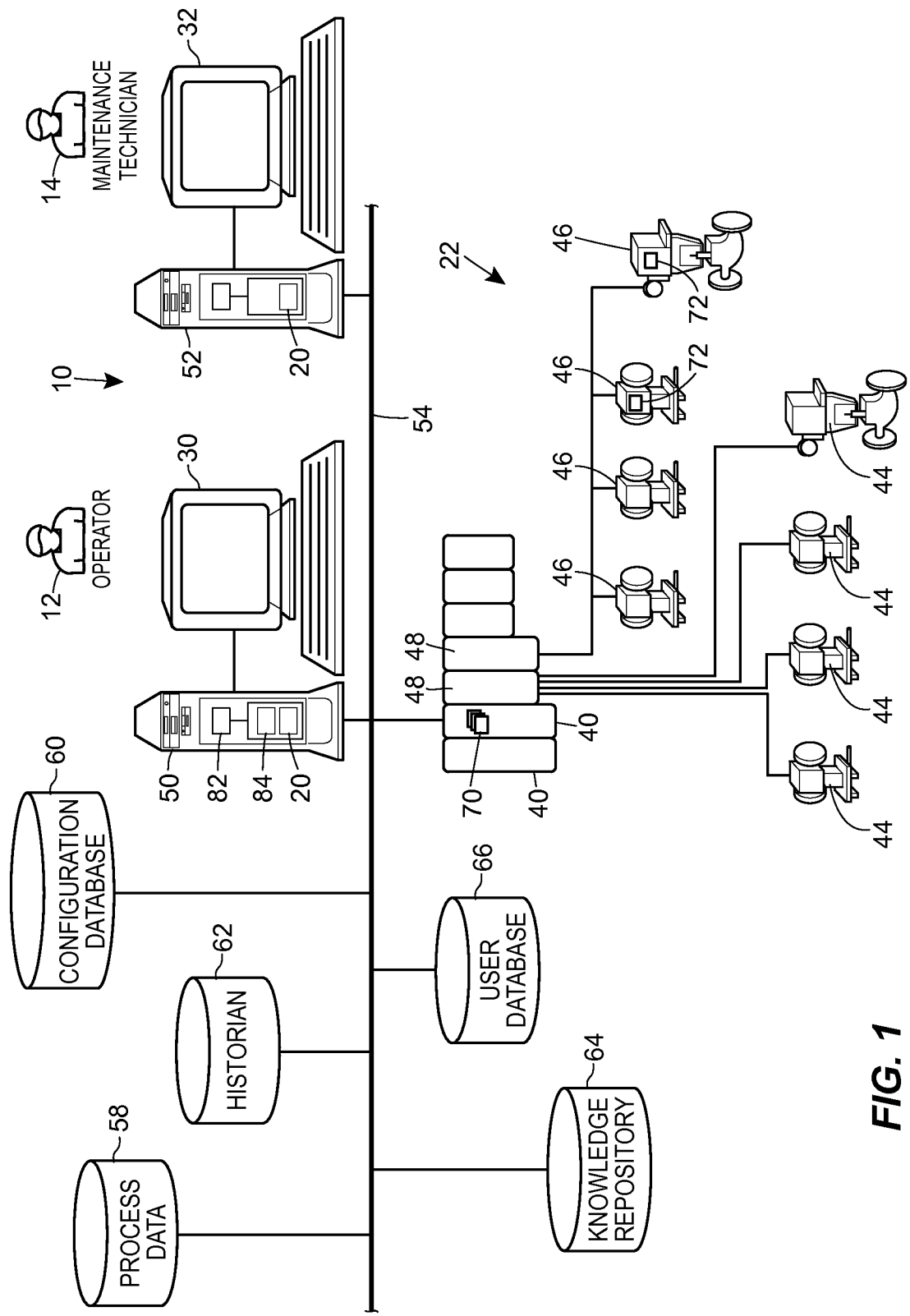
FIG. 1 is a schematic representation of process plant that includes a distributed process control network and several operator workstations that implement a configuration system having configurable user displays.

FIG. 1 illustrates an example process plant network 10 in which process plant personnel, such as an operator 12 and a maintenance technician 14, use one or more viewing or display applications 20 to supervise the operation of the process plant 10 and, in particular, a distributed control system 22 implemented within the process plant 10. The viewing or display application 20 includes a user interface application that uses various different displays to graphically depict similar or identical process graphics to each of the operator 12 and the maintenance technician 14 at respective workstations 30 and 32. However, in this case, the display applications 20 enable the graphical depictions to be presented to the user using display objects or elements that are user configurable so that, for example, each of the operator 12 and the maintenance technician 14 may adjust their respective display to view certain process information that is more relevant to their job or process information needed for the task they are currently performing. For example, the display generated for the operator 12 may include information related to one or several process control functions, such as the operation of control loops within the process control system 22, whereas a display generated for the maintenance technician 14 may include information related to one or several devices operating in the process plant 10, such as device trend data, current operational status data, etc. Importantly, the displays generated for the operator and the maintenance technician 14 are easily adjustable or configurable by the operator 12 or the maintenance technician 14 during operation of the plant 10 to provide these users with the information they need.

As is typical, the distributed process control system 22 has one or more controllers 40, each connected to one or more field devices or smart devices 44 and 46 via input/output (I/O) devices or cards 48 which may be, for example, Fieldbus interfaces, Profibus interfaces, HART interfaces, standard 4-20 ma interfaces, etc. The controllers 40 are also coupled to one or more host or operator workstations 50-52 via a data highway 54 which may be, for example, an Ethernet link. A process data database 58 may be connected to the data highway 54 and operates to collect and store process variable, process parameter, status and other data associated with the controllers and field devices within the plant 10. During operation of the process plant 10, the process data database 58 may receive process data from the controllers 40 and, indirectly, the field devices 44-46 via the data highway 54.

A configuration database 60 stores the current configuration of the process control system 22 within the plant 10 as downloaded to and stored within the controllers 40 and field devices 44 and 46. As discussed in more detail below, the configuration database 60 stores process control functions defining the one or several control strategies of the process control system 22, configuration parameters of the devices 44 and 46, the assignment of the devices 44 and 46 to the process control functions, and other configuration data related to the process plant 10. The configuration database 60 may additionally store graphical objects or displays as well as configuration data associated with these objects as described in more detail herein to provide various graphical representations of elements within the process plant 10. Some of the stored graphical objects may correspond to process control functions (e.g., a process graphic developed for a certain PID loop), and other graphical objects may be device-specific (e.g., a graphic corresponding to a pressure sensor).

Another data historian 62 stores events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository 64 stores references, operator logbook entries, help topics, or links to these and other documentation that operators and maintenance technicians may find useful when supervising the process plant 10. Still further, a user database 66 stores information about users such as the operator 12 and the maintenance technician 16. For each user, the user database 66 may store, for example, his or her organizational role, an area within the process plant 10 with which the user is associated, work team association, security information, system privileges, etc.

Each of the databases 58-66 may be any desired type of data storage or collection unit having any desired type of memory and any desired or known software, hardware or firmware for storing data. Of course, the database 58-66 need not reside in separate physical devices. Thus, in some embodiments, some of the databases 58-66 may be implemented on a shared data processor and memory. In general, it is also possible to utilize more or fewer databases to store the data collectively stored and managed by the databases 58-66 in the example system of FIG. 1.

While the controllers 40, I/O cards 48 and field devices 44 and 46 are typically located down within and distributed throughout the sometimes harsh plant environment, the operator workstations 50 and 52 and the databases 58-64 are usually located in control rooms or other less harsh environments easily assessable by controller, maintenance, and various other plant personnel. However, in some cases, handheld devices may be used to implement these functions and these handheld devices are typically carried to various places in the plant. Such handheld devices, and in some cases, operator workstations and other display devices may be connected to the plant network 22 via wireless communication connections.

As is known, each of the controllers 40, which may be by way of example, the DeltaV™ controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist, such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc., and are not limited to being designed and implemented using the function block or any other particular programming technique. Each of the controllers 40 may also support the AMS® suite of applications sold by Emerson Process Management and may use predictive intelligence to improve availability and performance of production assets including mechanical equipment, electrical systems, process equipment, instruments, non-smart and smart field devices 44, 46, etc.

In the plant network 10 illustrated in FIG. 1, the field devices 44 and 46 connected to the controllers 40 may be standard 4-20 ma devices, may be smart field devices, such as HART®, Profibus, or FOUNDATION® Fieldbus field devices, which include a processor and a memory, or may be any other desired type of devices. Some of these devices, such as Fieldbus field devices (labeled with reference number 46 in FIG. 1), may store and execute modules, or sub-modules, such as function blocks, associated with the control strategy implemented in the controllers 40 or which perform other actions within the process plant, such as data collection, trending, alarming, calibration, etc. Function blocks 72, which are illustrated in FIG. 1 as being disposed in two different ones of the Fieldbus field devices 46, may be executed in conjunction with the execution of the control modules 70 within the controllers 40 to implement process control, as is well known. Of course, the field devices 44 and 46 may be any types of devices, such as sensors, valves, transmitters, positioners, etc., and the I/O devices 48 may be any types of I/O devices conforming to any desired communication or controller protocol such as HART, Fieldbus, Profibus, etc.

With continued reference to FIG. 1, the workstations 50 and 52 may include various applications that are used for various different functions performed by the personnel within the plant 10. Each of the workstations 50 and 52 includes a memory 80 that stores various applications, programs, data structures, etc., and a processor 82 which may be used to execute any of the applications stored in the memory 80. In the example illustrated in FIG. 1, the workstation 50 also includes, in addition to the display and viewing application 20, one or more configuration applications 84 which may include, for example, control module creation applications, operator interface applications and other data structures which can be accessed by any authorized configuration engineer to create and download control routines or modules, such as the control modules 70 and 72, to the various controllers 40 and devices 46 of the plant 10 as well as to create displays or dashboards as described in more detail herein.

On the other hand, the display and viewing application 20 provides the operator 12 and the maintenance technician 14 with access to various types of information needed by these users to perform their various jobs or tasks during run-time of the process control network 22. Such information may include typical plant process and instrumentation displays which may illustrate various sections of the plant and the equipment and instrumentation within the plant to provide the user with a view as to the current state or status of various equipment and process variables within the plant. Still further, the display and viewing applications 20 may provide control routine information, such as control loop diagrams, setpoint settings, etc., maintenance information, such as information about the health or current operational status of various equipment in the plant, operational information such as throughput and output information, etc.

More particularly, the display and viewing applications 20 provide various displays during operation of the process plant 10 to enable the operator 12 to view and control various operations within the process plant 10 or, as is common in larger plants, within a section of the process plant 10 to which the operator 12 is assigned. The display and viewing application 20 may include, or cooperate with, support applications such as control diagnostic applications, tuning applications, report generation applications or any other control support applications that may be used to assist the operator 12 in performing control functions. Such support applications may be executed within the same or different computers as the display an viewing application 20. Further, the viewing application 20 permits the maintenance technician 14 to supervise the maintenance needs of the plant 10, e.g., to view the operating or working conditions of various devices 40, 44, 46 and 48. The display and viewing application 20 may also be connected to support applications such as maintenance diagnostic applications, calibration applications, vibration analysis applications, report generation applications or any other maintenance support applications that may be used to assist the maintenance technician 14 in performing maintenance functions within the plant 10.

Of course, one of the workstations 50 and 52 could be a simulation workstation that includes a number of simulation applications that may be used to simulate operation of the plant 10 or various sections of the plant 10 for any number of purposes, including for training purposes, for plant modeling purposes to assist in plant maintenance and control, etc. In this case, one or more of the display and viewing applications 20 may be used to provide a simulation operator with an interface into the simulated plant.

As noted above, operator display applications are typically implemented on a system wide basis in one or more of the workstations and provide preconfigured displays to the operator or maintenance persons regarding the operating state of the control system or the devices within a plant. These displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. Due to the typical size and nature of plants, numerous interconnected displays are typically created for use by the various operators and maintenance technicians to view the operation of the plant. In this case, an operator or other user may view a particular display illustrating a particular location or section of the plant and may need to scroll to or change to another display illustrating a different section of the plant. While the displays may have links that allow a user to easily switch or to navigate between two displays, these links are preconfigured by the configuration engineer who created the displays in the first place. As a result, the operator must be very familiar with the set of displays and the links within the displays that are available to easily navigate to new displays that may include information needed by the operator. In any event, the operator may want to view information that is provided in different displays simultaneously, which may be difficult or impossible to do if the configuration engineer did not provide a prefigured mechanism for doing so.

Moreover, these operator displays are typically defined in a programming environment, and once complete, are deployed for use by operators. If changes are required to a deployed display, the changes are performed in the programming environment and the display is then redeployed. Because proper design of displays is critical to the safe operation of a process plant, operators are not typically allowed to change the displays themselves. In addition, most operators do not have the training required to be able to program new displays.

To solve these and other issues, the display applications 20 of the system of FIG. 1 are configured to or are designed to enable a user to configure a new display or alter the configuration of a display to show various different types of information that the user wants to see on the same display screen or display screen configuration (in a case in which multiple display screens are used at the same time).

In particular, the display applications 20 of FIG. 1 enable operators to create their own process displays or dashboards in the same interface that the operators use to operate the process plant. In this system, the operators do not have to use or understand the graphics programming application and can make any number of specially configured dashboards, as needed for specific operator tasks. As a general matter, operators will be able to view any of a number of displays, which provide a preconfigured set of information to the operator on one or more user interface display devices or screens. Once created, displays or dashboards may be stored in a memory, such as one of the memories 80 of the workstation or user interface on which the operator is working, in the configuration database 60, the user database 66, etc.

Generally speaking, operators (or configuration engineers) can create their own displays as dashboards either during operation of the plant, or during configuration activities performed when initially configuring the displays to be used in the plant 10. Basically, a dashboard is a type of display with the unique capability that can be modified by operators (or other users) in standard, preconfigured manners. Each dashboard may have a defined layout, which layout may be based on a regular grid (column and row) layout (such as three columns and two rows or a three by three grid) or may be based on an irregular shape or layout configuration, such as having a row on the bottom or top of the screen and a column on the left or right of the screen, etc., all to define as set of dashboard spaces or regions at which different types of information can be shown in the display. Importantly, the grid pattern and what goes into the spaces in the grid pattern of a dashboard is operator modifiable and configurable.

In one case, operators can easily create content on a dashboard using predefined display building blocks call gadgets. Essentially, to build a dashboard, the user can access a library of gadgets, and can simply drag and drop a gadget onto a dashboard at a selected location or space in the dashboard. Thereafter, the application 20 will then configure the dashboard to display the gadget at that space or region of the dashboard. If desired, the user may move or manipulate a gadget by selecting a title bar of the gadget, but other manipulation methods may be used as well. If desired, the application 20 may automatically size the gadgets placed in a dashboard (and may change the grid pattern of a dashboard) based on the selected dashboard layout and the position or space at which the gadget is dropped onto the dashboard. Operators can modify an existing dashboard by adding, modifying, moving, minimizing or deleting gadgets on a dashboard. Using these concepts, which makes the operator displays configurable by a user during run-time of the plant, eliminates the need for display configuration engineers to create displays for all possible operator tasks, and makes operators more productive because these operators can quickly create their own set of dashboards, as these operators determine that these dashboards are needed.

Moreover, gadgets may be preprogrammed with simple choices and options referred to hereafter as "aliases" for the operator. Because these aliases or options are simple to view and to manipulate when creating or configuring a gadget, the user does not need to have any special training or graphics knowledge to create a dashboard using gadgets. Moreover, the inclusion of these choices and options in a gadget allows for a single gadget to be reusable across a variety of different uses or environments, such as to be used for displaying any types of process values, parameters or other process information.

Once created, dashboards and their associated customized or aliased gadgets may be manipulated and organized in various useful manners that make the use of these dashboards more user friendly and intuitive, thereby increasing the efficiency of the operators who use these dashboards. Generally speaking, the application 20 may store or save system dashboards and personal dashboards in a memory, such as in the configuration database 60 of FIG. 1. System dashboards may be preconfigured or pre-made dashboards that are stored in the system library and are available for all or most operators to use. Personal dashboards may be stored in the system library, but are generally associated with a particular user and may be easily found by that user in, for example, a personal folder for that user, when the user is logged into a workstation.

Moreover, dashboards created by a user or an operator may be automatically saved to the configuration system as a system dashboard in a system library, and therefore be available for other users or operators without performing extra configuration activities. Additionally, operators may be able to view dashboards belonging to or created by another user, and may use one of these dashboards as a starting point for creating their own dashboard(s). If an operator makes changes to a dashboard owned or created by another user, this new dashboard may be automatically saved as a personal dashboard of the operator. As a result, the application 20 makes it easy to create a custom, modified copy of an existing dashboard stored in the system library (e.g., a system dashboard) or a custom modified copy of a personal dashboard of that or another user. When enabling a user to modify a system or personal dashboard of another user, the application 20 may automatically create a copy for an operator to use as a personal dashboard. If a personal dashboard is found to be useful for more than one individual, the application 20 enables or allows a personal dashboard to be promoted to be a system dashboard stored within the configuration database at any time.

Additionally, to make the dashboards more accessible and to reduce the number of dashboards that an operator must view to select the appropriate dashboard for a particular task, the application 20 provides operators with an initial set of dashboards and display favorites automatically the first time these operators log into the system. For example, the application 20 may save, for each operator, one or more folders having the personal dashboards of that operator stored therein or favorite dashboards or displays for that operator, as previously identified by the operator (either manually or automatically, such as by tracking previous usages of displays or dashboards). These folders make the dashboards or displays that the operator is likely to use more often immediately available to the operator based on the operator's login credentials.

While dashboards may be created during runtime of the plant by an operator or other user, dashboards, such as system dashboards, may also be created by a configuration engineer during display configuration activities to provide an initial set of dashboards for an operator. In particular, the application 20 or a configuration application associated therewith may include a graphics programming application that provides a mechanism for the engineer to create a complex graphics visualization that is reusable in the editing environment. Generally, these graphics visualizations, referred to herein as a graphical element modules (GEMs), are reusable shapes that combine other shapes with behaviors. GEMs are defined and stored in the configuration system as objects, such as in the configuration database 60 or the user database 66. Subsequent changes to the GEM objects can be propagated to all uses of the GEM in other GEMs and displays. As such, objects corresponding to GEMs may be linked to other objects. However, the configuration engineer may also create gadgets in the graphics programming application, wherein a gadget may be a GEM that has been defined to be a gadget and thus available to an operator for creating dashboards. GEMs and gadgets may use the same alias concept, and all of the graphics capabilities available to a GEM may be available in a gadget. Upon creating a dashboard, if the engineer decides that a dashboard should no longer be modified, the engineer can change the dashboard from a dashboard to a system display. Such a system display looks the same to the operator, but can now only be modified in the graphics programming application.

An engineer can also define some parts of a dashboard as not being modifiable. An example of this would be for the engineer to allocate a portion of a dashboard for gadgets, but to program the rest of the dashboard with standard graphics elements (e.g. circles and squares) that are not modifiable by the operator. The operator could then add, modify, rearrange and delete gadgets only within the allocated portion of the dashboard. In this manner, GEMs, gadgets, displays and dashboards are concepts used in both the configuration programming environment and in the application or runtime environment.

Still further, display navigation may be improved by the application 20 showing all of displays (including system displays and dashboards) available to the operator in an organized list or set of lists. The lists may use folders to organize the references to the available displays and dashboards. A folder might be used to define the displays relevant to portion of the process plant to provide hierarchical navigation through various different physical or logical parts of the plant, or might be used to define the displays used for a particular task, such as "shutdown." A display (or a dashboard) can be shown or provided in multiple folders, so that the display (or dashboard) is easily accessible for a variety of tasks to be performed by a user as well as by what portion of the plant the user is viewing.

However, because there are often several hundred displays in a control system, the application 20 further aids the operators by enabling the operators to organize the displays they use most commonly into their own list of favorite displays. The favorites list for an operator may use folders to organize the displays, allowing a display to be referenced in multiple folders. As a result of these features, operators do not have to rely on engineers to have programmed all of the display navigation needed to optimally perform their tasks.

Of course, as will be understood, dashboards are treated like any other display within the application 20 for navigation, with the addition that personal dashboards for a particular operator are automatically organized to make these dashboards easy to find for that operator, by both being shown in the user's folder and by being automatically added to the user's list of favorite displays. Still further, displays are often programmed to include display navigation features, such as next, previous, up and down displays. Either a display or a dashboard can be defined with these features in any desired manner. If the currently logged on operator had created their own personal dashboard from the referenced dashboard, the control system may automatically access that user's personal dashboard in response to a navigation command between displays. If the operator had not created their own personal dashboard, the system defined dashboard could be accessed instead. Still further, the application 20 may use security features of the control system to manage or control which operators are allowed to create and modify dashboards. This feature ensures that only operators with the right process knowledge are allowed to create and modify dashboards.

Figure 2:
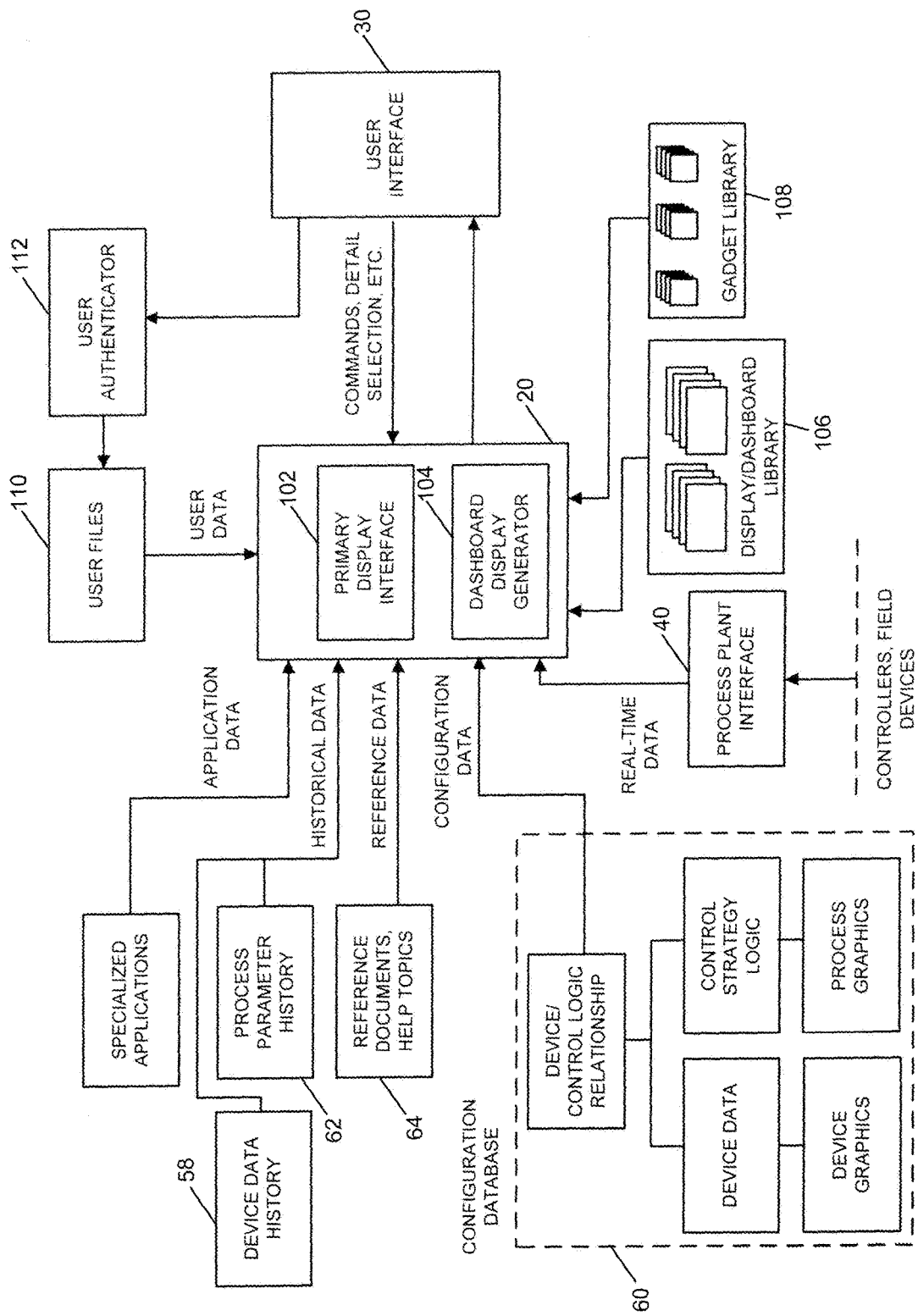
FIG. 2 is block diagram that illustrates a data flow diagram associated with the operation of a display configuration system having a display creation and generation application that enables users to create and configure displays within a process plant environment.

FIG. 2 illustrates an example data flow diagram used by or associated with the display applications 20 as well as details of the display application 20 and the manner in which associated components thereof operate. More particularly, the display application 20 is illustrated in FIG. 2 as including a primary display interface element or logic 102 and dashboard (display) generator element or logic 104. As will be understood, the primary display interface logic 102 includes the logic or programming for generating displays on a user interface, such as one of the user interfaces 30 or 32 of workstations 50 and 52 of FIG. 1.

As illustrated in FIG. 2, the primary display interface logic 102 interacts with a user interface device (illustrated in FIG. 2 only as device 30) to receive user commands, to provide and illustrate information to the user using one or more display objects (called displays) currently being viewed by or used by the user to view or interact with the plant 10. Of course, the logic 102 receives commands, selections, data, etc., from the user via the user interface 30 to manipulate the display and to interact with the display.

The display interface logic 102 uses one (or more) of a set of preconfigured display forms (called displays) which may be implemented as display objects in an object-oriented programming environment, to define the information and display characteristics provided to the user via the user interface 30. These preconfigured displays are illustrated or are provided as preconfigured displays or dashboards stored in a display/dashboard library 106. As noted above, the displays within the library 106 may be various engineer created system displays, which can be fixed and non-changeable displays created by a configuration engineer, or the displays in the library 106 may be dashboard displays that have been promoted up to the system level as system dashboards by one or more users, or the displays in the library 106 may be personal dashboards (dashboard displays) associated with one or more users.

Of course, when using a particular display or dashboard as stored in or obtained from the display/dashboard library 106, the primary display interface logic 102 may receive or obtain many different kinds of process and plant information from various different sources within the process plant 10 or control system 22 to which the application 20 is connected, in order to fill out or generate the display on the user screen or interface 30. In particular, as illustrated in FIG. 2, the primary display interface logic 102 may receive or obtain information from the configuration database 60 of FIG. 1 which is illustrated in FIG. 2 as including numerous sources or kinds of data including device data and device graphics, control strategy logic and process graphics. The configuration database 60 also includes device/control logic relationship information all of which, as well as any other configuration data stored in the database 60, may be provided as configuration data to the primary display interface logic 102. Of course, the logic 102 may obtain this data or parts of this data based on the display (or dashboard) being implemented or executed by the logic 102 at any particular time.

Still further, as illustrated in FIG. 2, the primary display interface logic 102 may receive reference data such as reference documents, help topics, etc., from, for example, the knowledge repository database 64 of FIG. 1 or from any other source. Still further, the primary display interface logic 102 may receive historical data such as device history data from the process data database 58 of FIG. 1, and process parameter history from the historian 62 of FIG. 1. Also, the primary display interface logic 102 may receive application data from specialized applications, such as control applications, maintenance applications, data analysis applications, tuning applications, etc. which may be run in or on workstations, controllers, field devices or other processing devices of the plant 10. Additionally, as illustrated in FIG. 2, the primary display interface logic 102 may receive real-time data from a process plant interface which may be, for example, an interface in a controller 40 of FIG. 1 or any other the control system interface such as a gateway, etc. In any event, the real-time data may include real-time controller data, field device data, alarms and alert data, trend data collected by field devices or controllers or any other real-time data from the process plant 10 or the control system 22 within the plant 10. Any or all of this data, as well as other types of data, may be obtained by and received by the primary display interface logic 102 and provided to a user in a manner or format called for by the display or dashboard currently being implemented by the primary display interface logic 102 to generate a user display for the user.

The dashboard display generator logic 104 of the application 20 enables a user who is logged onto or who is interfacing with the application 20 to generate or create new dashboards (which are types of displays) to be used by the primary display interface logic 102 for displaying information to the user. In particular, the dashboard display generator logic 104 includes logic or programming executed on a processor (not illustrated in FIG. 2) that allows a user to select a dashboard for creation in, for example, one of the manners described in more detail below, and to fill out that dashboard in a manner that creates a complete dashboard display that operates to provide particular process control or plant information in a particular format to the user in the manner that the user views as being most desirable.

More particularly, when creating a dashboard, the user may specify a particular dashboard format or layout that defines numerous or various regions or spaces within a display screen including the size and the relative spacing of the various regions. If desired, the user may select or use one of the dashboards or displays stored in the display/dashboard library 106 as a form or template dashboard and may then modify or change the specifics of that template dashboard to create a new dashboard. Alternatively, the user may define a new dashboard. In any event, after specifying or selecting the form or layout of the dashboard to be created, the user may use one or more gadgets, as stored in a gadget library 108 for example, to specify the particular display format or informational characteristics of the various regions of the dashboard being created. In particular, the user may select or specify one or more of the gadgets stored in the library 108 and may drag and drop those gadgets into the various different regions or spaces of the dashboard to associate the gadget functionality with those particular locations or regions of the dashboard. If desired, the gadgets in the gadget library 108 may be preconfigured gadgets tied to specific equipment, logic or data within the plant 10, in which case the gadgets, as stored in the library 108 have various aliases, names, tags or connections filled out to cause the gadget to provide display functionality with respect to or using particular plant data of a particular type received from a particular location within the plant, such as data from a particular field device or a particular controller within the plant, particular data from the data historian 62 or another database in the plant 10, etc. In this case, the user does not need to configure the gadget in any great detail, as the gadget, as stored in the library 108 is already preconfigured and thus tied to a particular plant asset and thus, during operation as part of an executing dashboard, will communicate with that asset to retrieve particular types of data to be displayed to the user. Of course, in this case, a great number of preconfigured gadgets will need to be stored in the gadget library 108 to enable the user to be able to select or find a gadget of the correct format that is tied to the particular plant asset that the user wishes to view in the display.

On the other hand, the gadgets, as stored in the gadget library 108, may be more generic in nature and thus need not be tied to a particular plant asset when stored in the library 108. In this case, the gadget needs to be configured by the user during the process of creating a dashboard. More particularly, when a user selects a particular gadget, gadget configuration logic within the dashboard display generator logic 104 will enable a user to specify the plant asset or plant assets of the plant to which the gadget is to be connected during the time that the gadget is used as part of a dashboard. As part of this configuration, the user may be allowed to search for and select various plant assets to which the gadget is to be tied by, for example, tag name, aliases, communication links, etc. In many cases, a particular gadget may need to include numerous links to various data within the plant, as the gadget may need to receive two, three or more types of data to perform a display function associated with the gadget. In this case, the user may be enabled to specify each of the links to the plant assets or data sources to be used by the gadget individually. However, if desired, to assist the user in this task, the gadget library 108 may also store one or more forms that that relate to, or that specify the various data sources or links associated with various assets in the plant and which enable a user to specify each of the data sources for a particular plant asset to be used by a gadget by specifying which form to use. As an example, forms may be created and stored in the gadget library 108 (for example), which list or store, in an organized manner, the various data source links to each of the types of data associated by or provided by a particular plant asset, such as a unit, a piece of equipment, a controller, a control loop, etc. The form may be set up as a spreadsheet having various fixed fields that are the same for each of the same type of unit or plant asset. Thereafter, when a gadget is selected, the gadget may, itself, only store links to the various fields of a generic form that is applicable for the particular type of gadget or to the specific operation that the gadget may perform. Thereafter, the user may need only to specify the name of or the link to the general asset, such as a particular unit (a set of equipment) in the plant or a piece of equipment in the plant or a controller in the plant or a control loop in the plant, for example, and the gadget configuration logic will then find the form previously created for that asset and use that form to fill out the specific links in the gadget for that plant asset, thereby enabling a user to configure a gadget having multiple links to the plant assets or types of data in the plant 10, by merely specifying the particular asset to which the gadget is to be tied.

Moreover, no matter how the data links are configured in a gadget, the user may need also need to configure a selected gadget by specifying or selecting various display or behavior options associated with the gadget, such as the type of and animation behavior of the display elements associated with the gadget. For example, the gadget configuration logic may enable a user to indicate whether the gadget is to display data as raw data values, as a graph or a bar chart, using a trend graph or slider, etc. The gadget configuration logic may also enable a user to specify colors, fonts, and other formatting features of the display element created by the gadget, and to specify particular manners in which the user may interact with the gadget, such as using input fields, slider bars, etc., and the gadget configuration logic may enable the user to specify or select any other gadget configuration features.

Once the user has created a new dashboard by configuring each of the desired gadgets and placing these gadgets into the desired locations, spaces or regions of the new dashboard using the dashboard display generator logic 104, the user may store the newly created dashboard in the library 106 as a personal dashboard (available for that user) or as a system dashboard (available to all or at least some other users). Additionally, if desired, the user may promote the dashboard into a system display by converting the dashboard into a display, meaning that the dashboard can no longer be changed. In any event, the user may, at some point later in time, select the dashboard to be the display to be used by the primary display interface logic 102 to interface with the user to view run-time operation of the plant 10.

Additionally, the primary display interface logic 102 may be programmed to provide the list of dashboards and displays that are most relevant to, or that are favorites of a particular user, to the user for easy navigation by the user. In particular, each user may have a set of personal dashboards and favorite dashboards and displays stored within a set of user files 110. Upon logon to the application 20 or the system in which the application 20 is used, as determined by a user authentication system 112, the user may be provided with a list of "favorite" displays and dashboards and "personal" dashboards, and may be able to select one or more such dashboards or displays from these lists to select a dashboard or display to use in viewing the operation of the plant 10 at any particular time. The user lists of dashboards can be provided as lists of favorite displays and/or dashboards, personal displays and/or dashboards, or as displays or dashboards (e.g., personal and system displays and dashboards) organized by user role or activity, organized by plant area, organized by equipment type, organized by task, etc. Thus, the lists of displays and dashboards (which lists point to displays and dashboards stored in the library 106) may be organized to group displays and dashboards relevant to a particular user, a particular group of users, roles performed by users (e.g., operator roles, maintenance roles, configuration engineer roles, business manager or plant manager roles, etc.), tasks, etc. Of course, in this case, the authentication system 112 may authenticate users by social security number or any other user identifier, by user login information or in any other manner in which users are tracked within the plant control system 22. Upon receiving this user identification information, the application 20 may access the list(s) of user displays for that user and provide the list(s) to the user as part of the information provided to the user by the primary display interface logic 102. These lists may be provided to a user using, for example, tabs, drop down menus, icons or other lists that are easily selectable and viewable by the user. This feature enables a user to easily find a display or dashboard that the user desires to use when interacting with the plant and to easily switch between or navigate between displays or dashboards during the performance of his or her tasks.

Figure 3:
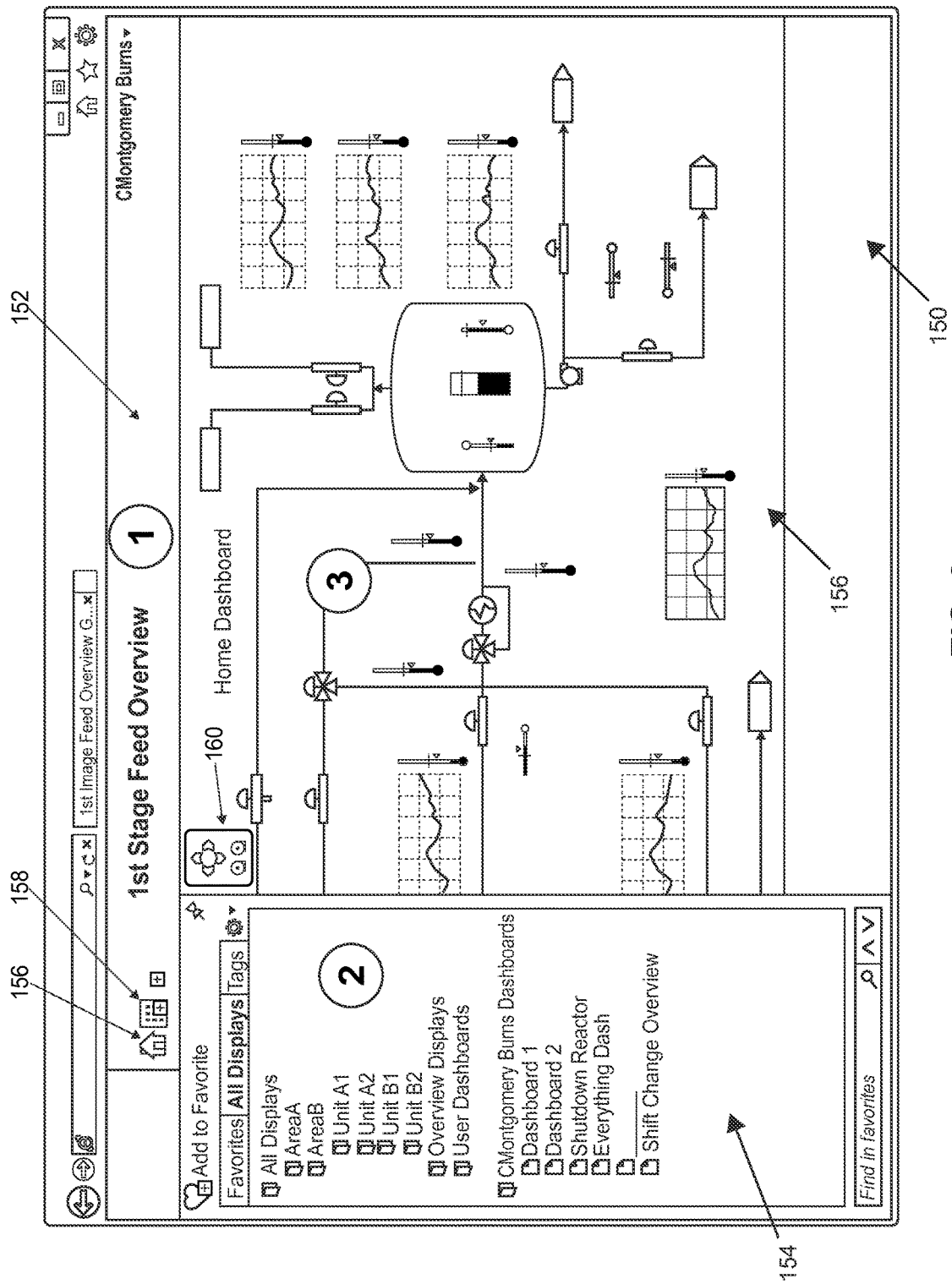
FIG. 3 is display screen illustrating a user interface that may be provided by a display generator application to enable a user to view, create and modify dashboard displays.

FIG. 3 illustrates an example display screen 150 that may be generated by the primary display interface logic 102 of FIG. 2 and may be provided to a user logged into the system, to enable the user to select and view one or more displays to use to interact with the plant or to view the plant operation, as well as to create new dashboards and displays using gadgets. In particular, the display screen 150 includes three main sections including a title or header bar 152, a navigation pane 154 and a display area 156. Here, the header or title bar 152 includes a number of selectable buttons such as a home button 156 and a dashboard generator 158. Likewise, the navigation pane 154 includes number of tabs including the "Favorites" tab and "All Displays" tab and a "Tags" tab which the user may use to see lists of displays (including dashboards) available to the user. The user may navigate through the various lists of displays provided by these or other tabs to find and open various displays, including system displays and dashboards and personal dashboards. For example, the Favorites tab may store the user's predefined favorites or most used displays or dashboards, the user's personal dashboards, the displays or dashboards last or most used by the user, etc. The All Displays tab may enable the user to view or select any displays in the system or stored in the library 106 of FIG. 1, and the Tags tab may be used to illustrate displays or dashboards associated with particular devices, areas, control loops or other plant tags used within the plant. Of course, these or other tabs could be provided in the navigation pane 154 to organize links to displays and dashboards in any other desired manner. For example, an "Action" tab may provide a list to displays associated with certain actions in the plant, like start-up and shut-down procedures in the plant, calibration procedures, tuning procedures, etc. Other tabs could be provided to list displays created for or tailor to particular user roles, such as operator roles, configuration engineer roles, maintenance roles, simulation or training roles, etc.

Of course, the user can use the navigation pane 154 to find or locate and to select a particular display (or dashboard) to use and to have the application 20 of FIGS. 1 and 2 use that display for interacting with the plant 10 and providing information to the user in the display region 156. As illustrated in FIG. 3, the display region 156 includes a display that illustrates a piping and instrument diagram (P&ID) for a particular portion of the plant 10 as well as providing a number of graphs indicating various data or process variables within the P&ID of the plant 10. Additionally, the display area 156 includes a navigation icon 160 which may be used to go forward, back, up or down in a set of hierarchically or logically related set of displays. For example, going back and forward may go to a display showing a P&ID for a previous or next section of the plant, while going up in the displays may provide a display associated with a higher level of the plant, such as a unit or an area of the plant, and going down may illustrate more detailed information about the particular region of the plant, such a control diagram, an equipment diagram, etc. In one case, the user may define, when creating a dashboard, where that dashboard should be located in the display navigation hierarchy so that the display will be found and shown in the proper place when using the navigation icon 160. In other cases, where a display hierarchy has already been defined, personal dashboards created by the user from system displays in that hierarchy may be shown to the user when using the navigation icon 160 instead of the system display from which the personal display was created. If no personal dashboard was created for a particular system display within the hierarchy, then the system display will be shown.

Figure 4:
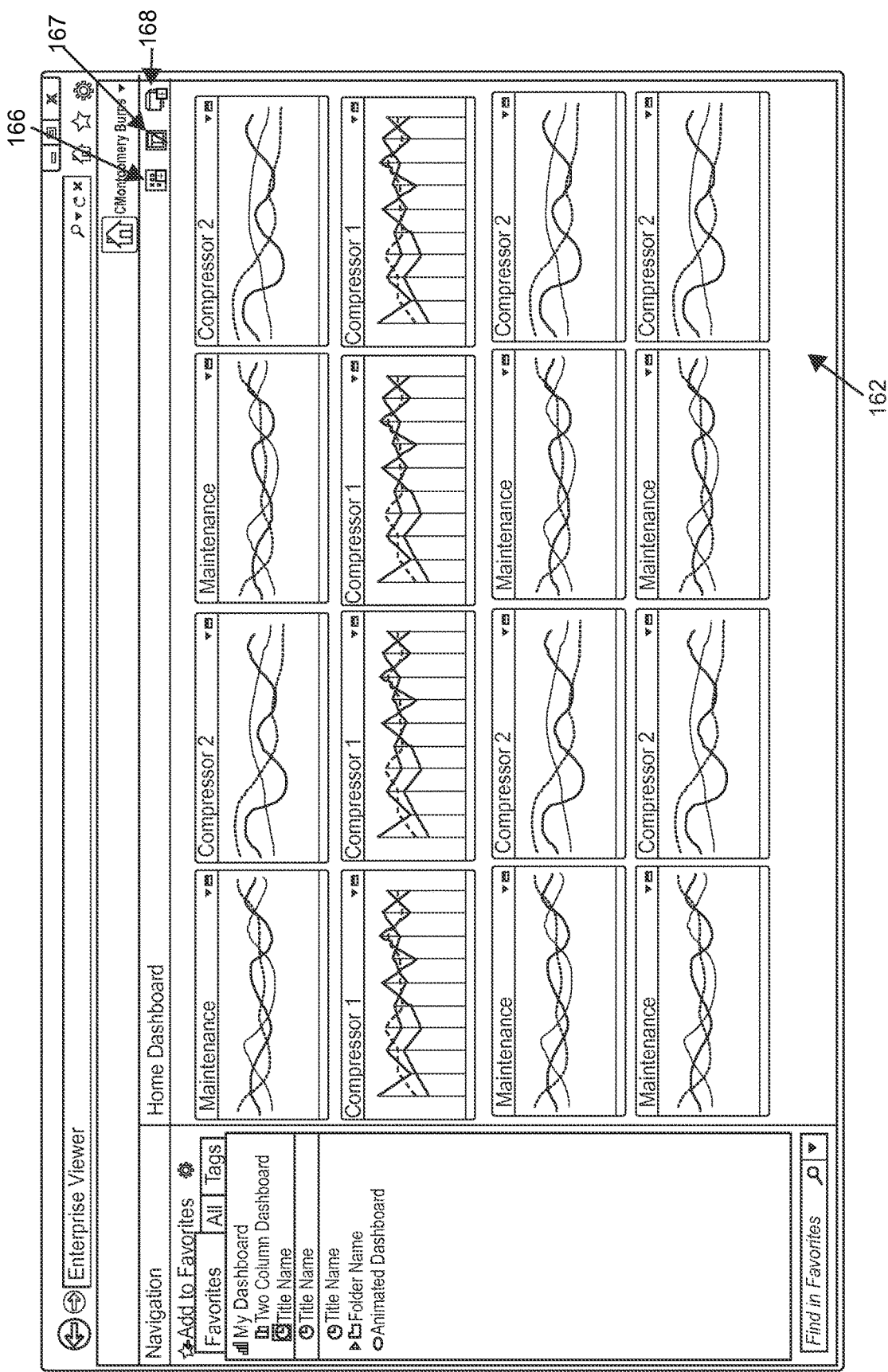
FIG. 4 illustrates an example dashboard display made up of various gadgets.
Figure 5:
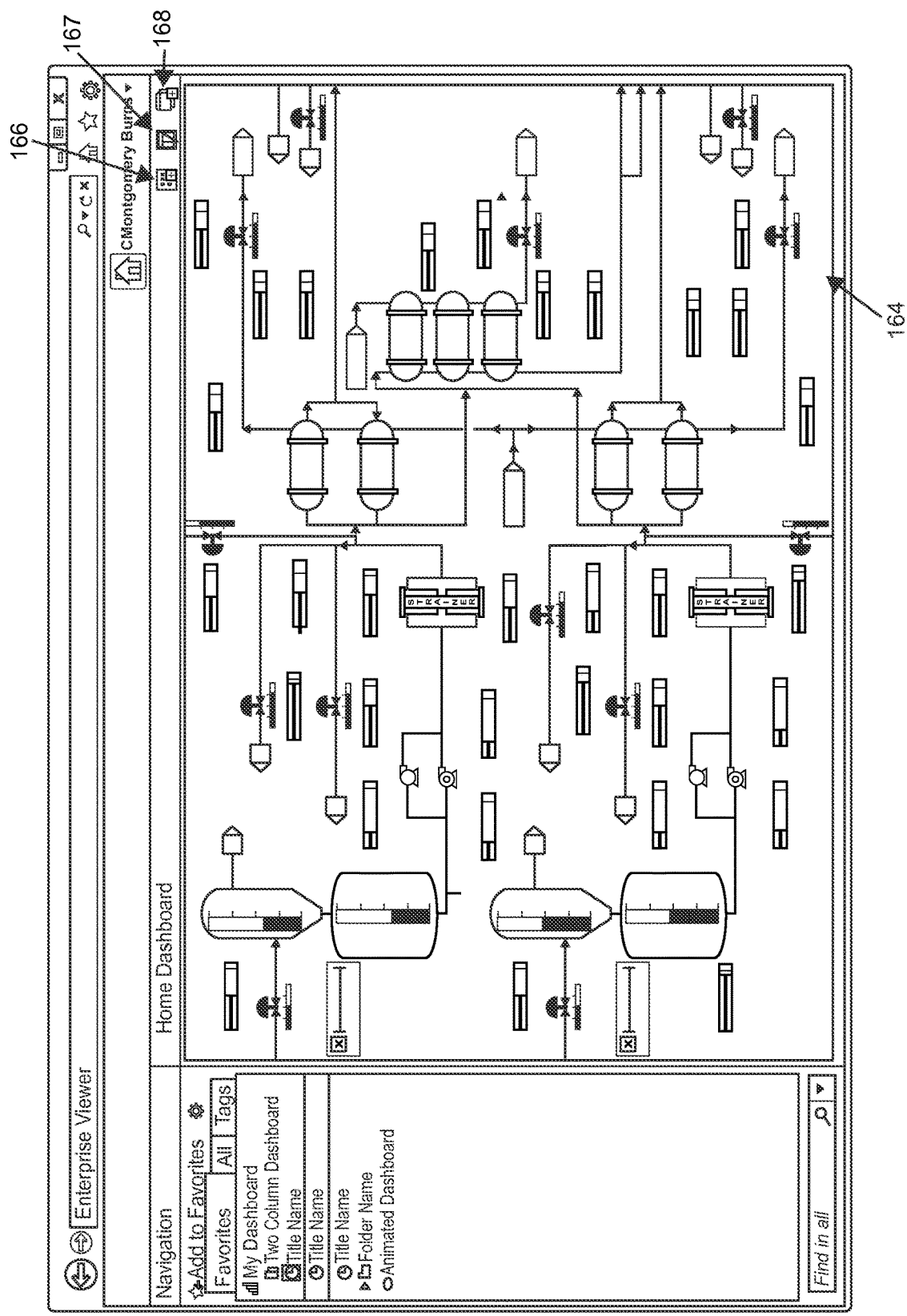
FIG. 5 illustrates an example of another dashboard display.

FIG. 4 illustrates a screen display window 62 associated with or created by a dashboard listed in a user's favorites tab (in the navigation pane of the display 162). In this case, the dashboard is defined to provide a four-by-four grid of graphs illustrating the values of various plant variables that the user may wish to see together to make comparisons or to follow the operation of the plant 10. The dashboard window 62 of FIG. 4 may include or may be made up of 16 gadgets, as will be described in more detail below, wherein each gadget corresponds to or provides one of the graphs in the screen or display window 162 of FIG. 4. FIG. 5 on the other hand illustrates a display window 164 made up of one gadget which is a P&ID of a portion of the plant 10 and which may also be in the user's list of favorites in the navigation pane. Both of the title bars of the screens 162 and 164 of FIGS. 4 and 5 include a display or dashboard generator icon 166, and dashboard modification icon 167 and a gadget configuration icon 168 which may be used to create new dashboards or to make changes to the dashboard currently being displayed in the screen.

In particular, when the user selects the dashboard generator icon 166, the application 20 recognizes that the user wants to create a new dashboard and begins this process. Of course, the user may select a particular dashboard that already has information within it, such as the dashboard of FIG. 5 which illustrates a P&ID of a portion of the plant, from which to start or as a template dashboard. However, as an initial matter, when enabling a user to create a new dashboard, the application 20, and in particular the dashboard display generator logic 104 of FIG. 2, enables a user to specify the form or layout configuration of the new dashboard.

Figure 6:
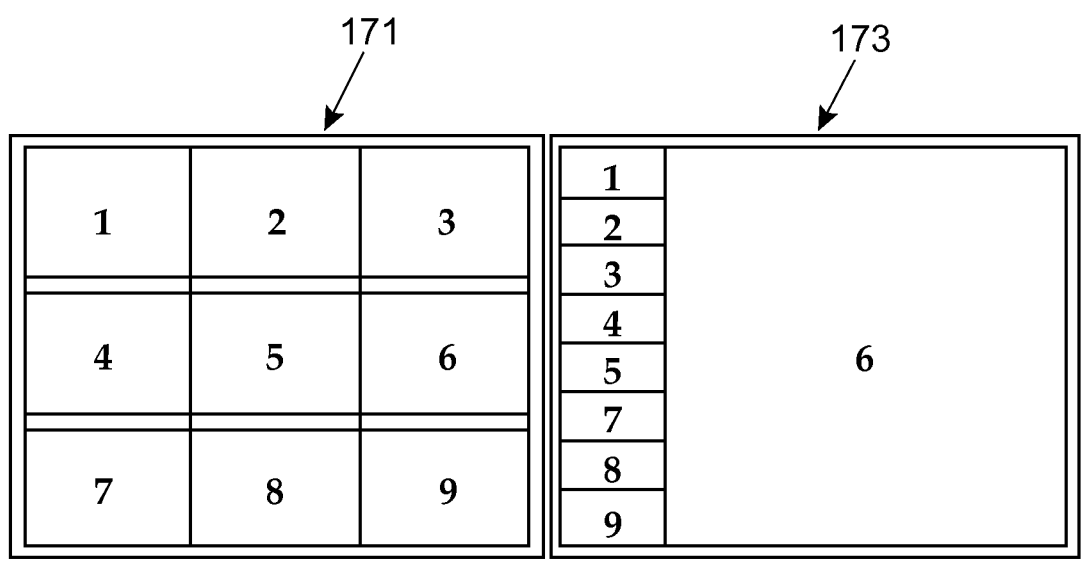
FIG. 6 illustrates various dashboard layout configurations.

As illustrated in FIG. 6, the user may first select the format of the dashboard by specifying a dashboard set up or layout using, for example, a grid pattern. Grid patterns 171 and 173 of FIG. 6 illustrate a couple of example grid patterns that may be used to create a dashboard, but many, many other patterns could be specified or used as well. The grid pattern of a dashboard can be a regular grid pattern such as the pattern 171 of FIG. 6 (which illustrates a three-by-three pattern of the same sized regions or spaces) or an irregular grid pattern such as the pattern 173 of FIG. 6 (which illustrates a grid pattern have two columns with eight smaller regions in the first column and one large region in the second column). Of course, the user could specify various different types or patterns of regions for the dashboard and the regions can be of the same or different sizes and shapes. Also, if desired, the dashboard generation logic 104 may enable a user to specify whether the displays in a region are configurable or not. That is, one or more regions of the dashboard may include a fixed display element, such as a P&ID, while others of the regions may be configurable using, for example, gadgets available to the user.

Figure 7:
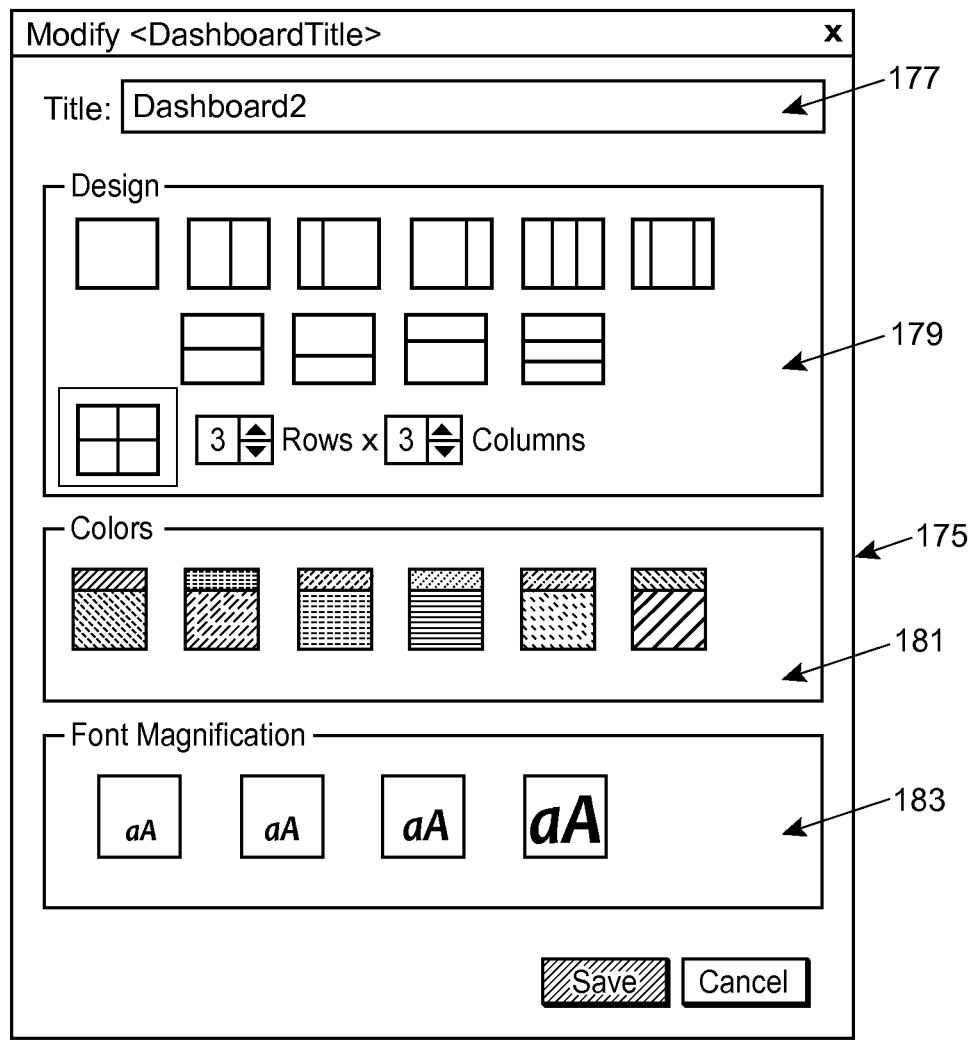
FIG. 7 illustrates a display window that may be used to enable a user to configure a dashboard layout.

FIG. 7 illustrates an example display window 175 that may be produced by the dashboard generator logic 104 of FIG. 2 to enable a user to define the various formatting aspects of a dashboard being created. In particular, the display window 175 includes a title box 177 in which the user may enter the title of the dashboard, and a region or display layout design section 179 which a user may use to select a number of predefined dashboard layout designs. In particular, the user may select one of the pre-defined dashboard layout designs (each icon in this region specifying a different layout design), or the user may indicate that a grid pattern is to be used and may input the number of rows and the number of columns in the grid pattern using the provided input boxes. Still further, a selection region 181 may be used to select or specify color or color patterns associated with each of the rows or columns or regions of the specified grid pattern, while a selection region 183 may enable a user to define various font and magnification sizes for data or text within the dashboard. Of course, these or other types of selection controls may be provide to the user to enable the user to specify the design and layout of a particular dashboard and, of course, the design of a dashboard is not limited to the options illustrated in FIGS. 6 and 7.

Once the user has created or specified a dashboard layout design, the user may then fill in or specify the viewable or displayable features of each of the regions in the dashboard design. For example, the user may select to illustrate a P&ID for a portion of the plant 10 in one of the regions of the dashboard and may specify graphs, charts, variable information, user controls, etc. to be placed or viewable in the other regions of the dashboard. In one embodiment, the user may use the gadgets in the gadget library 108 of FIG. 2 to specify the displayable features for each of the regions of the dashboard being created.

Generally speaking, to fill in the dashboard, the user may obtain or select gadgets, as stored in the gadget library 108 of FIG. 2, to apply to the various regions within a dashboard. Of course, the dashboard display generator logic 104 may provide a list of gadget or gadget icons and other information about the gadgets to allow the user to select a gadget to be placed in or used in each of the regions or spaces of the dashboard layout. Thus, for example, when the user selects a gadget configuration icon 168 of, for example, the screens of FIG. 4 or 5, the dashboard generator logic 104 of FIG. 2 may provide or display a number of gadgets in a pop-up window or otherwise and may allow or enable the user to then select one of these gadgets for use in the dashboard being created or modified. Upon selecting a gadget, the dashboard generator logic 104 may then provide a further pop-up window or other type of display to enable the user to easily fill out or specify the information about the gadget that is needed to tie the gadget to particular data or elements of the process plant (e.g., data stored in a database or provided in real-time operation of the plant 10 about a physical or logical element in the plant 10).

Figure 8:
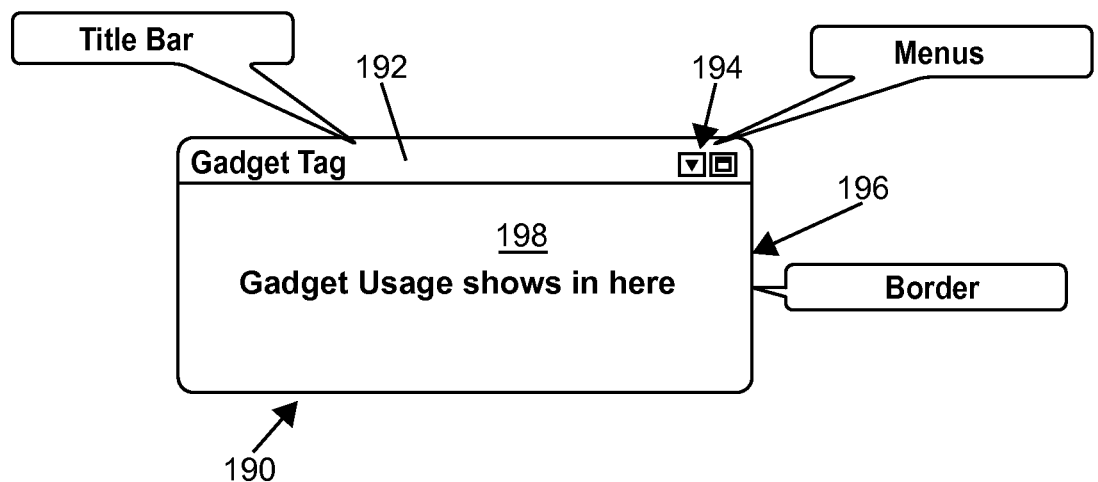
FIG. 8 illustrates a generic gadget display visualization.

FIG. 8 illustrates a gadget display 190 depicting one manner in which a gadget may be shown within a display screen when used in a dashboard. As illustrated in FIG. 8, the gadget 190 includes a title bar 192, which may be user selectable and fillable and which displays a name that may be provided by a user. The title bar 192 also includes a set of menus icons 194 which may be options or features associated with the gadget and preprogrammed into the gadget to provide various alterable or viewable functionality for the gadget. A border 196 is disposed around a gadget usage region 198 which illustrates the information to the user in one of a number of predefined manners, which manners may be selectable by the user.

Figure 9:
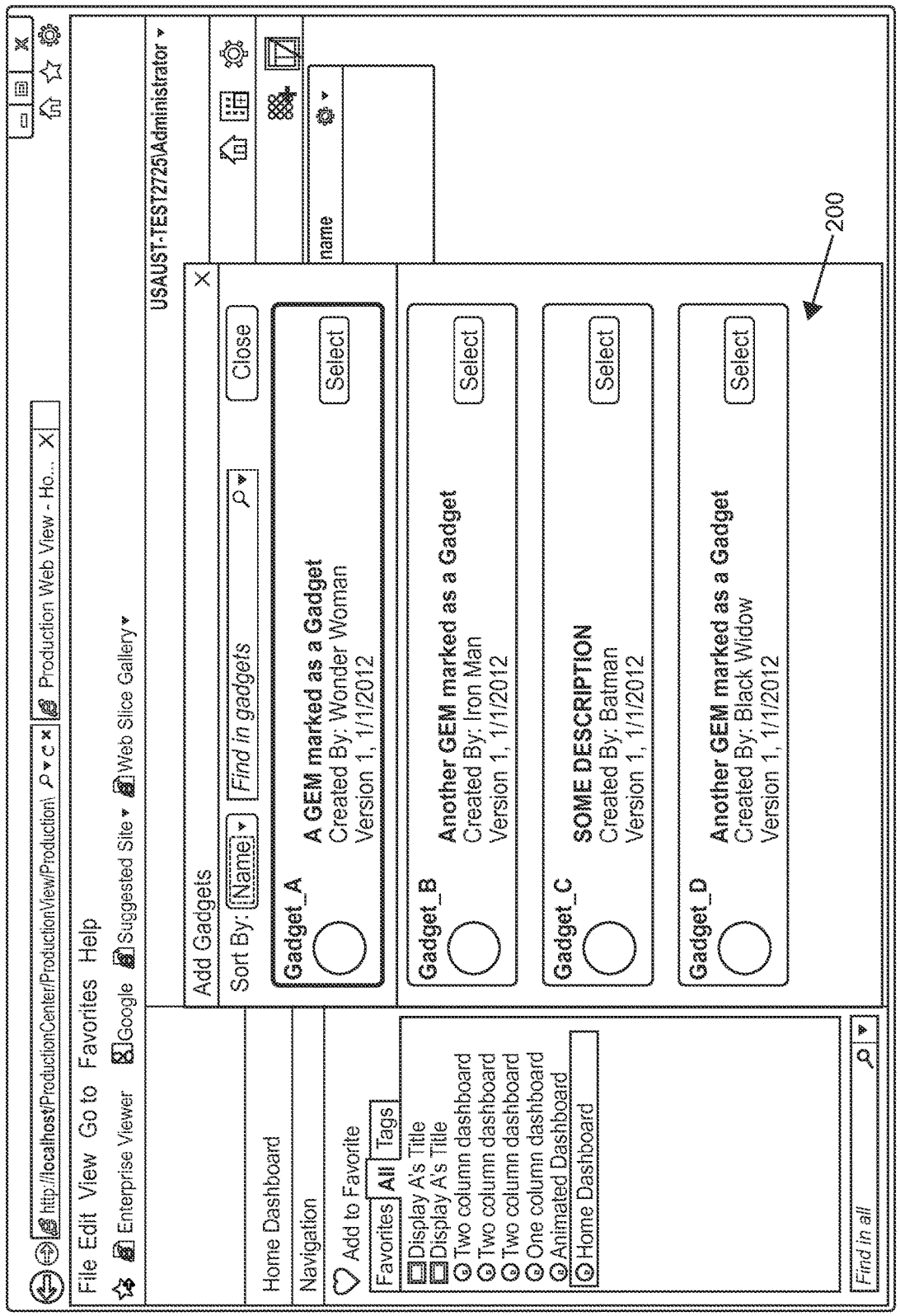
FIG. 9 illustrates a gadget configuration screen that enables a user to select a gadget for use in a dashboard.
Figure 10:
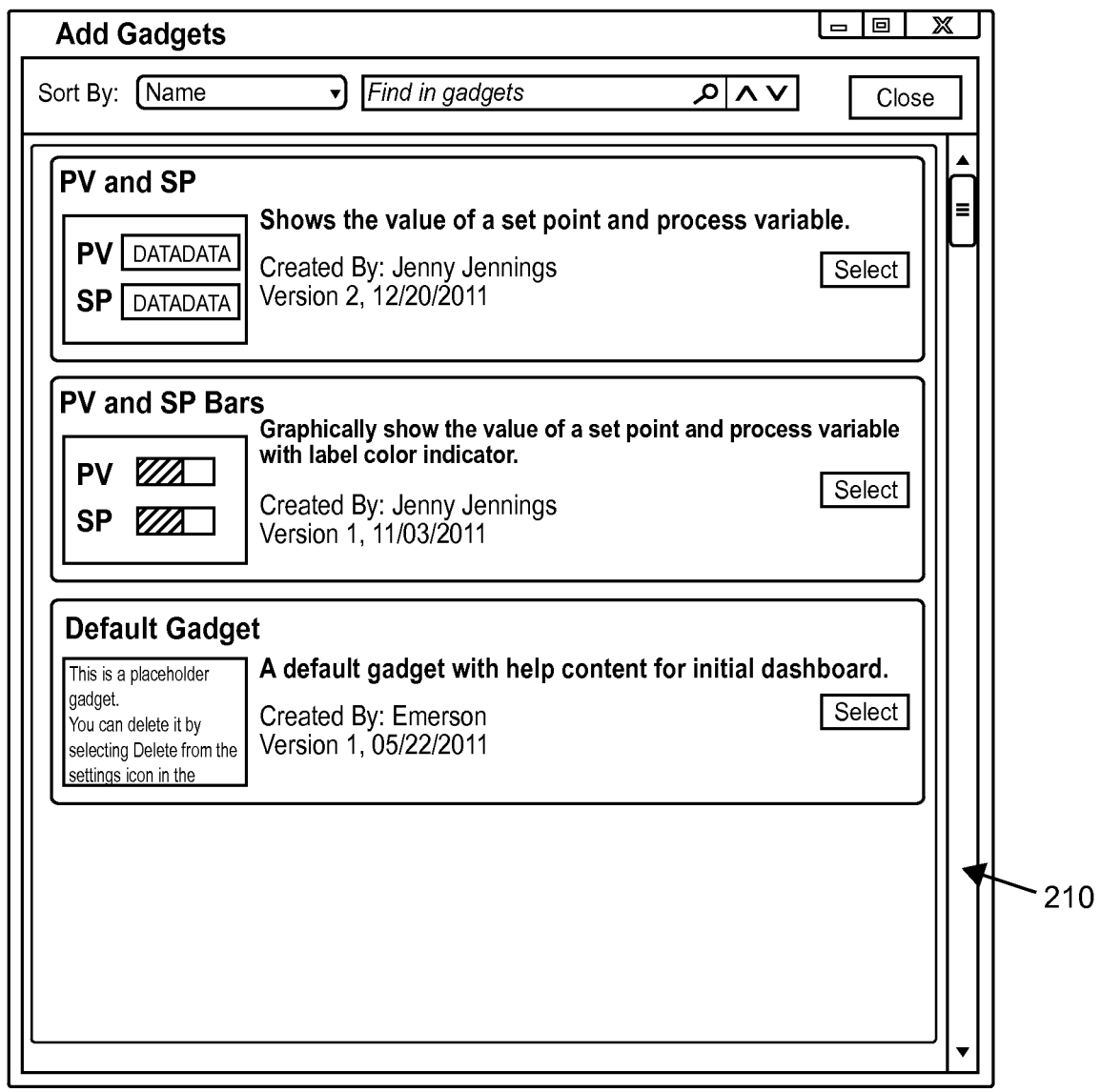
FIG. 10 illustrates a further gadget configuration screen that enables a user to select or specify visualization properties of a gadget.

As an example only, FIG. 9 illustrates a drop-down menu 200 that may be provided to the user by the dashboard generator logic 104 to allow the user to select one or more gadgets (as stored in the gadget library 108 of FIG. 2) for use or placement into a dashboard being created or modified. In this case, references to four gadgets are illustrated in the drop-down menu 200. However, references to more or less gadgets can be provided to the user. The user may of course scroll through the provided list of gadget references to access more gadget references to select. Once a user selects a gadget reference, the user may be provided with a screen that enables the user to configure the gadget to define the on-line display operation of the gadget. For example, FIG. 10 illustrates a display screen or window 210 which may be provided by the gadget configuration logic within the display generator logic 104 of FIG. 2 to enable the user to specify the manner in which data will be illustrated in the gadget display area 198 (FIG. 8) on a user interface screen when the gadget is implemented within a dashboard display. The options that are provided to the user in this case are illustrated as options that (1) display the value of a set point (SP) and a process variable (PV) as raw data values, (2) display the value of a set point and a process variable as bar graphs or (3) display the value of a set point and a process variable in a default manner. Of course, the display screen 210 of FIG. 10 could be also used to select a gadget in the first place. Still further, more or other display windows may be provided to provide the user with other selectable options about the gadget or to configure the gadget and the list of configuration options is not limited to the options illustrated in FIG. 10. In fact, many, many other types of display or animation features can be provided as part of optional gadget functionality, including the use of graphs, animations, fillable items such as tanks, movable items such as valve components, etc.

Figure 11:
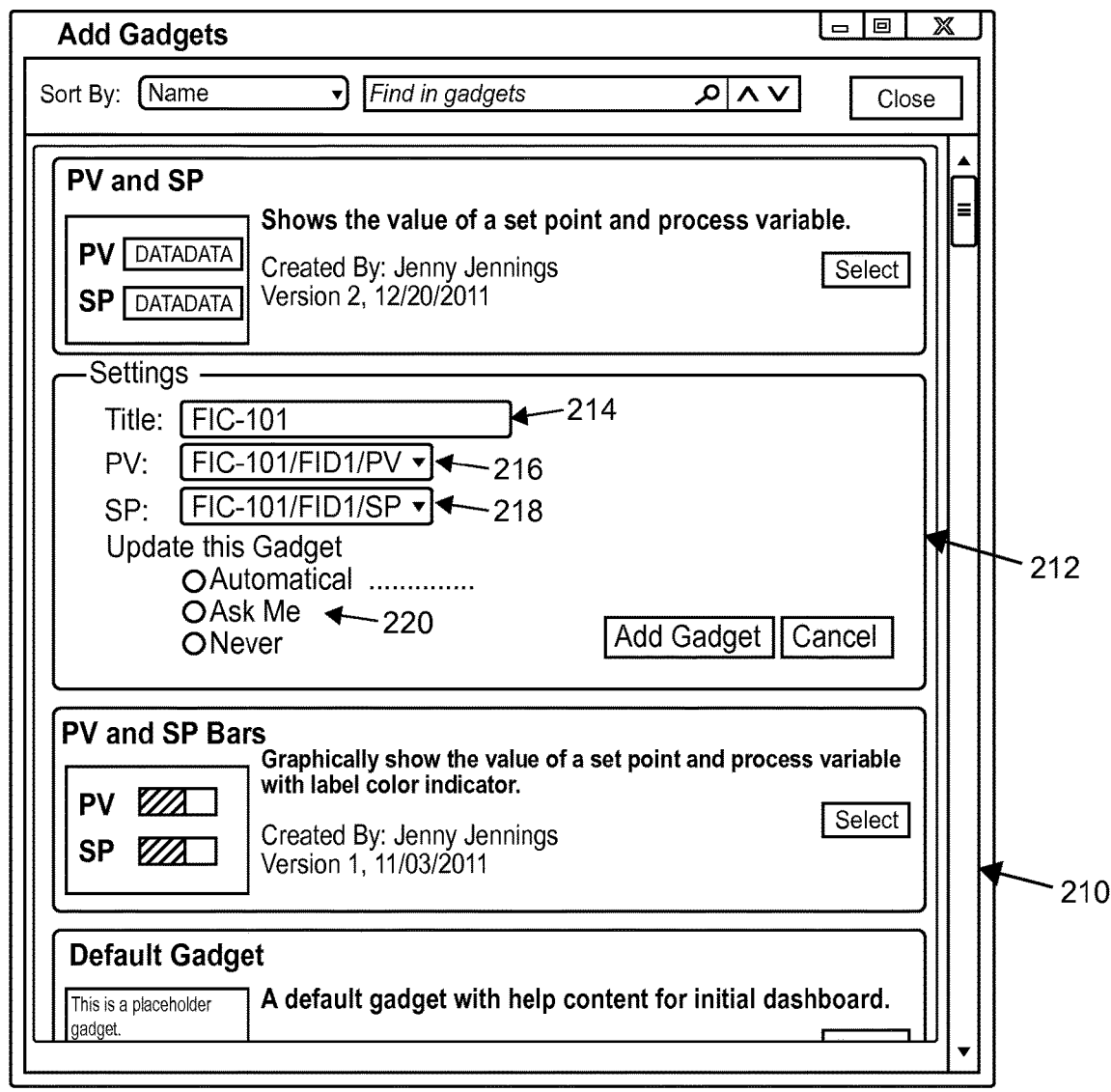
FIG. 11 illustrates a still further gadget configuration screen that enables a user to select or specify data connections for use by a gadget.
Figure 12:
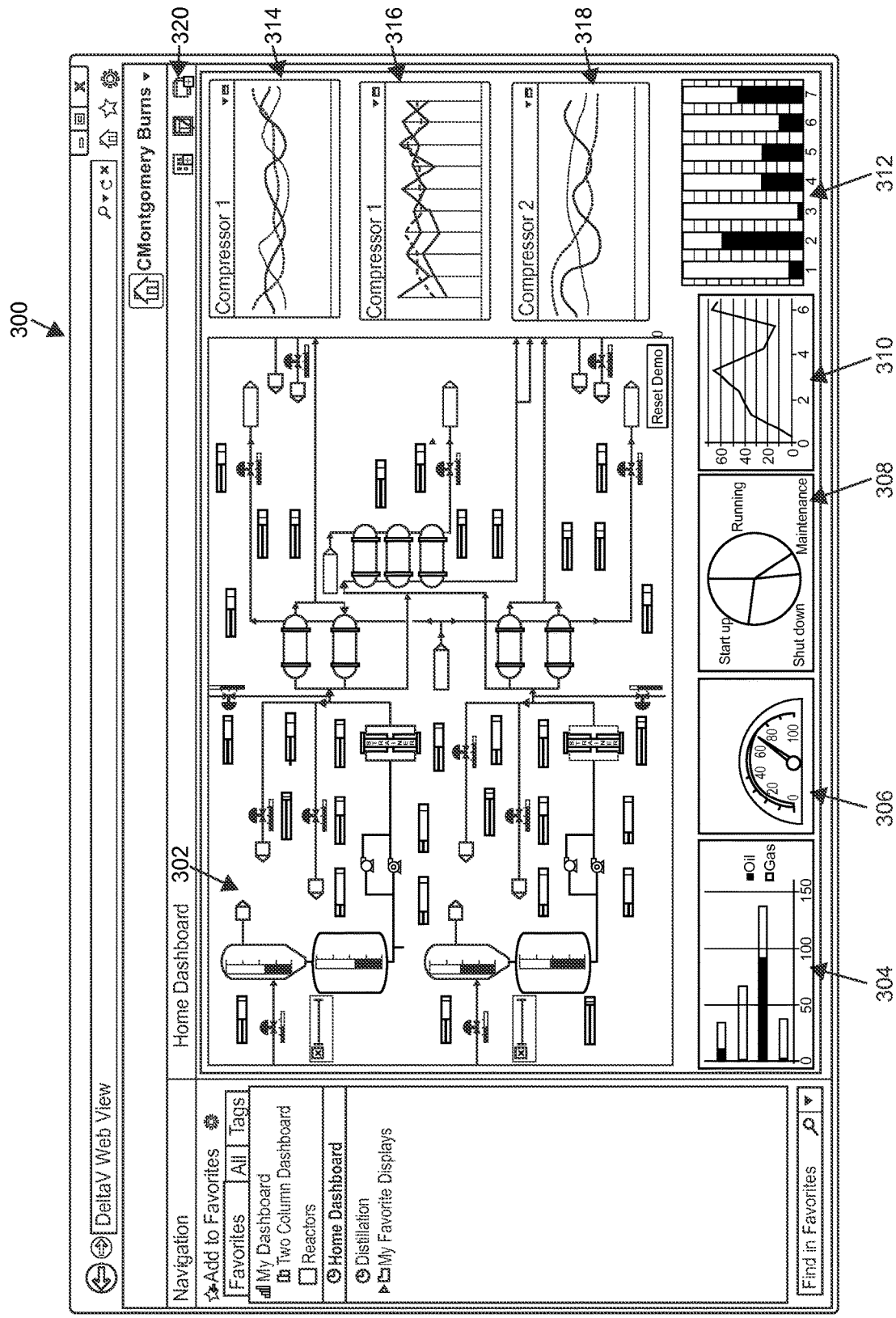
FIGS. 12-16 illustrate various screens that may be provided to a user during the process of selecting and adding a gadget to a dashboard to create a new dashboard display.

In any event, once a user has selected a gadget and has specified the animation and display properties of the gadget, the gadget configuration logic within the dashboard generator logic 104 of FIG. 2 may provide a configuration screen that enables the user to tie the gadget or variables or display features illustrated in the gadget to data or elements within the plant 10. FIG. 11 illustrates a configuration screen 210 in which a further configuration region 212 is provided to the user upon the user selecting the top gadget configuration feature of FIG. 10. The region 212 includes user entry boxes 214, 216 and 218 which enable a user to configure the gadget by specifying the data within the plant 10 that the gadget is to use, or to which the gadget is to be tied for display purposes. The user entry box 214 may be used to allow the user to enter a title for the gadget that may be displayed in the title bar 192 of the gadget window of, for example, FIG. 8. The boxes 216 and 218 may be used to allow the user to specify the particular data or links to data that are to be used by the gadget logic in creating the display properties for that gadget. In this case, the user may be able to enter names or aliases of the data which the gadget is to use, or the user may be provided with a drop down menu for selecting links to data. While not illustrated in FIG. 11, the user may also be able to specify a form to use for the gadget that would automatically enable the fields 216 and 218 to be properly filled in. Of course, the fields 216 and 218 may be automatically filled in by the gadget generation logic based on a context of the gadget or dashboard in which the gadget is being used. For example, the boxes 214 and 216 or the menus provide with these boxes may be filled in based on a P&ID that already exists in the dashboard to limit or narrow the field of search the user may have to perform to find the correct data links or aliases. Another section 220 of the configuration region 212 may be used by the user to indicate when to update the gadget with new values. In this case, the selectable options provided to the user include automatic updating when changes in the data occur, updating upon asking the user or not updating. Of course, other options could be provided as well to enable a user to define these or other behaviors of the gadget during runtime.

Once created or configured, the gadget can then be placed into any of the spaces or predefined regions of the dashboard as previously defined by the user, and the gadget will then operate or execute during runtime to provide information of the type and in the manner specified or configured by the user during the gadget configuration activities. Of course, the user can configure or create other gadgets for each of the other regions or spaces of the dashboard being created, to thereby create or configure an entire dashboard. The application 20 may then store the dashboard as created in the dashboard library 106 of FIG. 2 and may place the created dashboard in one or more user lists for the user or for other users to enable easy access of the dashboard by the user or other users.

Figure 13:
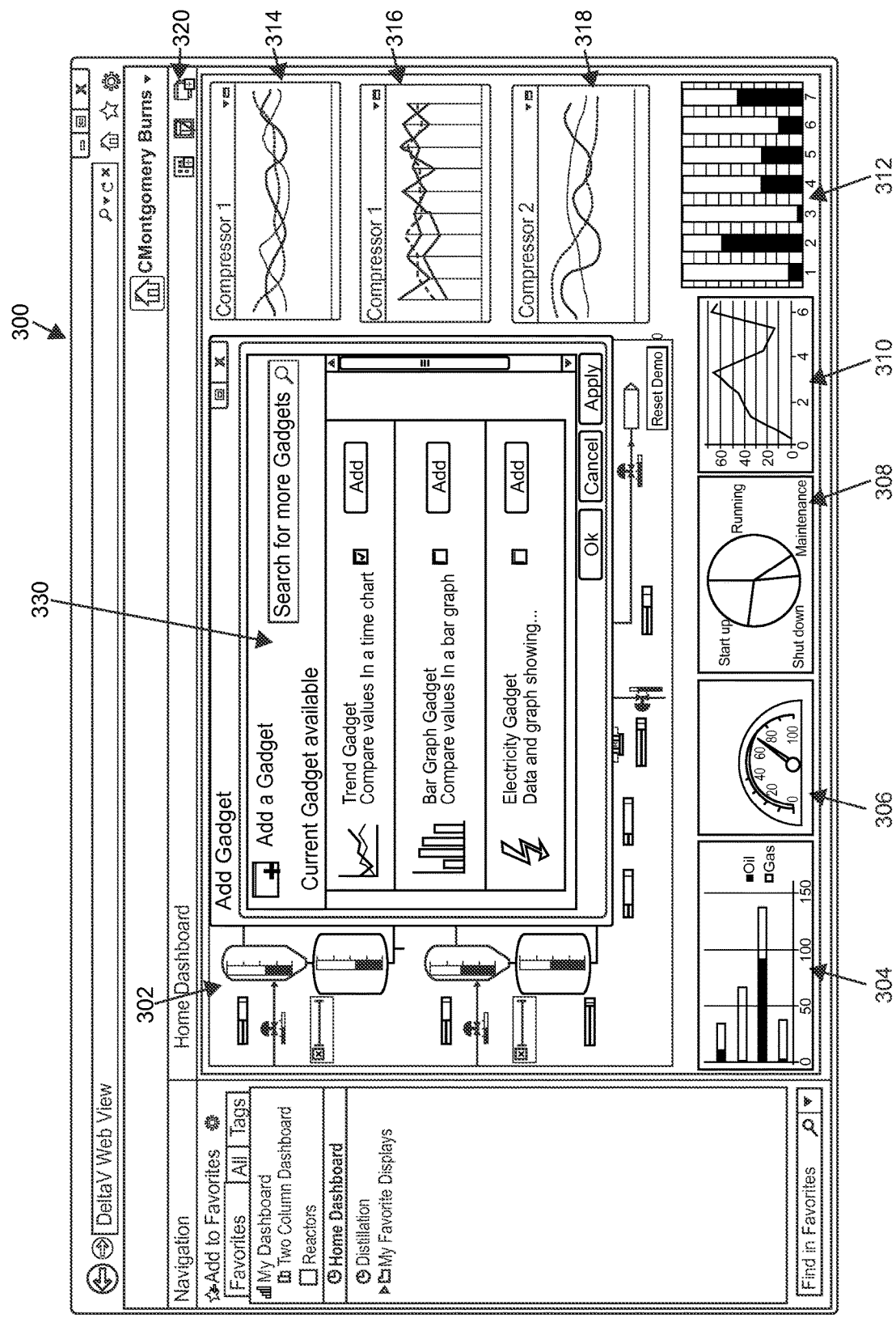

FIGS. 12-16 illustrate a process that may be implemented by a user via interaction with the application 20 on a user interface when the application 20 uses the dashboard generation logic 104 to enable the user to add a new gadget to an already existing dashboard, to upgrade or change a dashboard or in the process of creating a new dashboard. The dashboard 300 of FIG. 12 includes a number sections or regions including in a main region 302 on the upper left side of the diagram including a P&ID for a portion of the process plant 10, and various preconfigured charts below that diagram 302 in the form of charts 304, 306, 308, 310 and 312. In this example, the P&ID 302 and the charts 304-312 are preconfigured portions of the dashboard and are not able to be changed by the user in this dashboard. These portions of the dashboard may have been created by a configuration engineer as part of a system display or dashboard during configuration activities. However, the dashboard 300 of FIG. 12 also includes a number of gadgets therein in the form of gadgets 314, 316 and 318 (as illustrated by the use of title bars in these displays in conformance with the gadget display format of FIG. 8). In this case, the user may desire to add a new gadget to the set of gadgets in the display area, and may thereby select the add or configure gadget icon 320 on the display to begin the process of adding a gadget to the dashboard 300. When doing so, as illustrated in FIG. 13, a pop-up window 330 appears on the display screen 300 which presents a set of potential gadgets that can be added or that are stored in the gadget library 108 of FIG. 2. The pop-up screen 330 may include a number preconfigured gadgets as stored in the gadget library 108 which may be already configured for a particular process variables such as one or more of the variables within the P&ID 302 in the dashboard 300, variables associated with variables or process values in the charts or graphs 304-312, or even variables used in the other gadgets to 314 to 318. The user may scroll down through the list of gadgets provided in the pop-up window 330 and may select one of the gadgets to be added by clicking or selecting the appropriate add button. Of course, other configuration screens may be provided to the user to completely specify a gadget in any of the manners, for example, in any of the manners described above.

Figure 14:
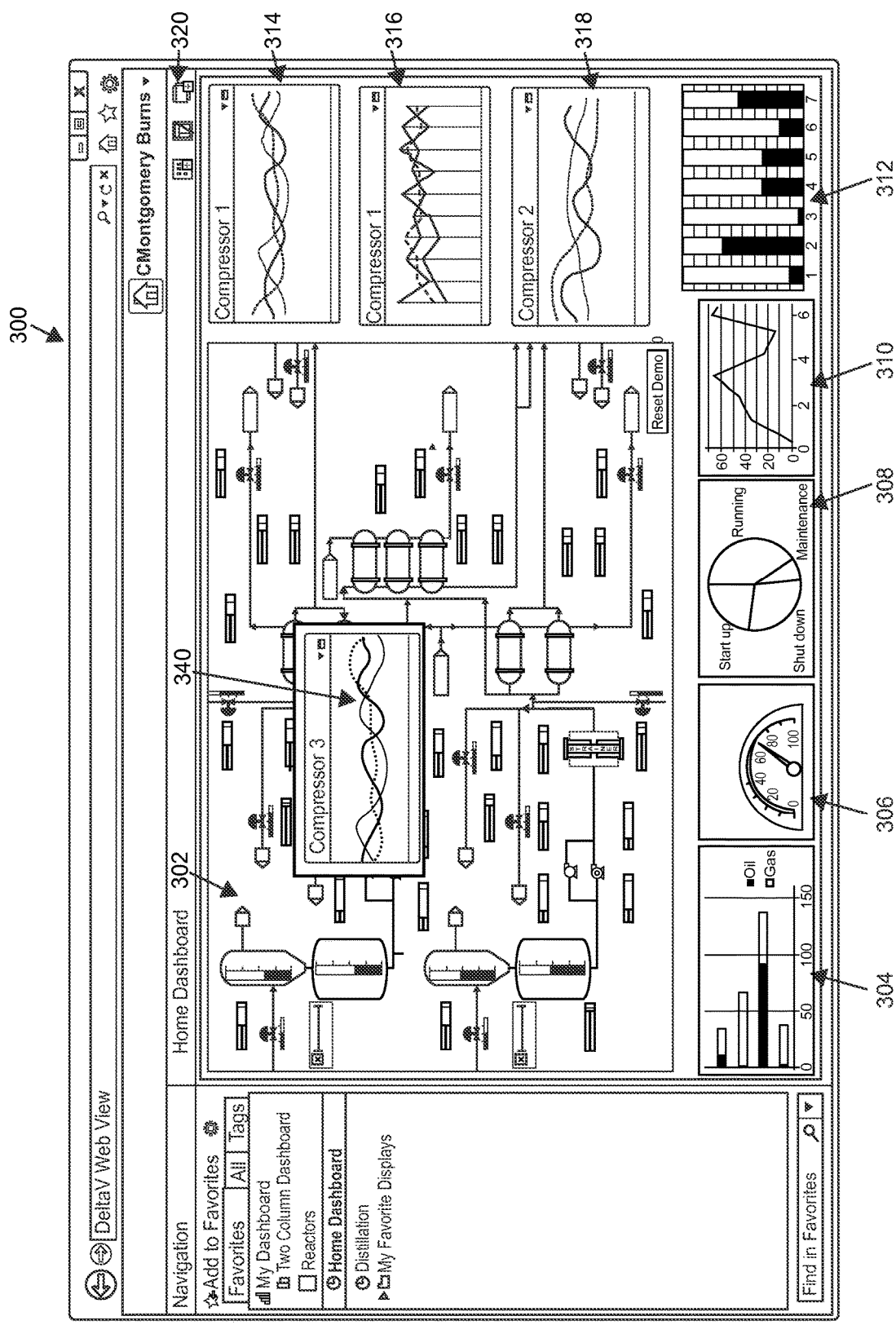
Figure 15:
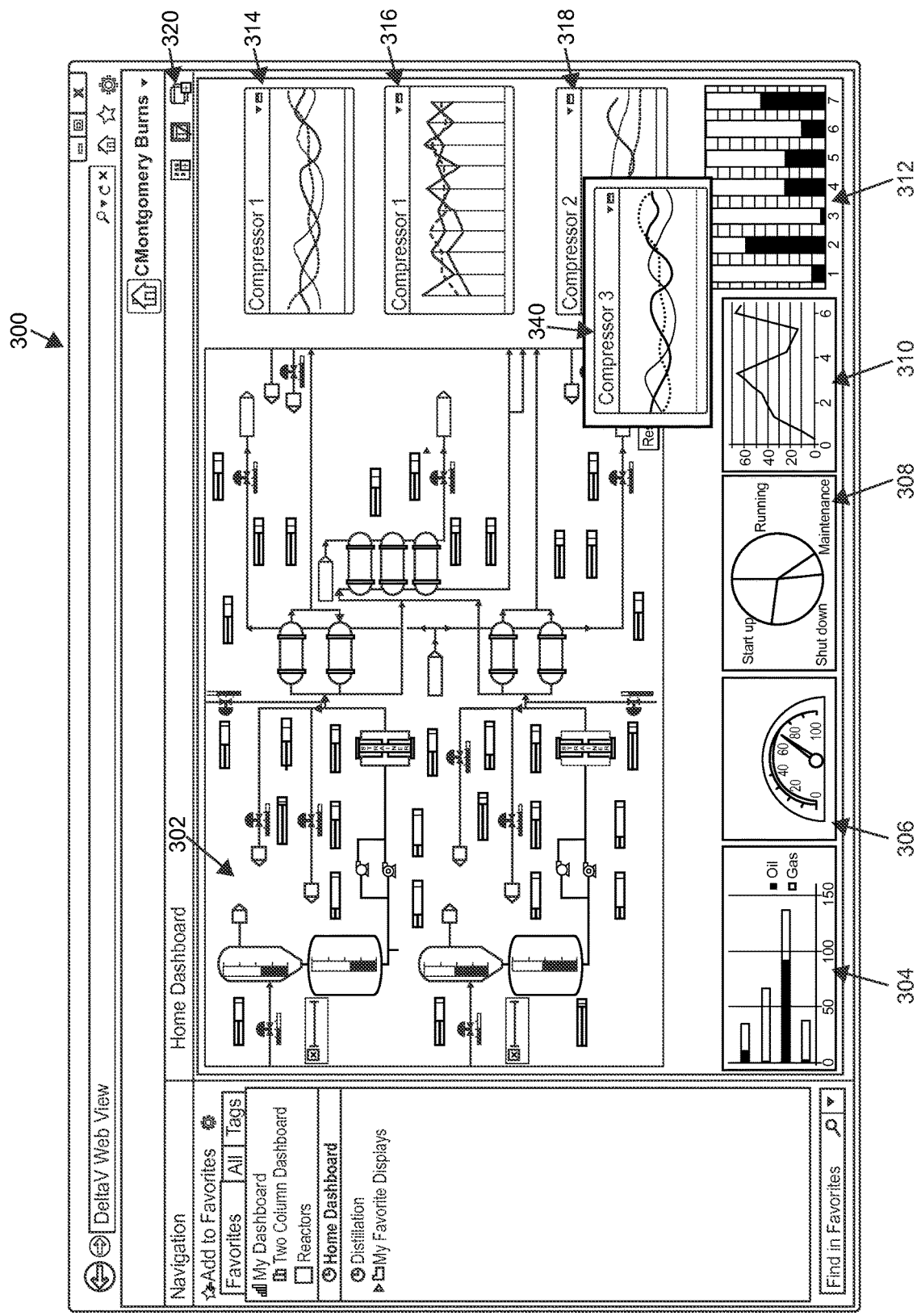
Figure 16:
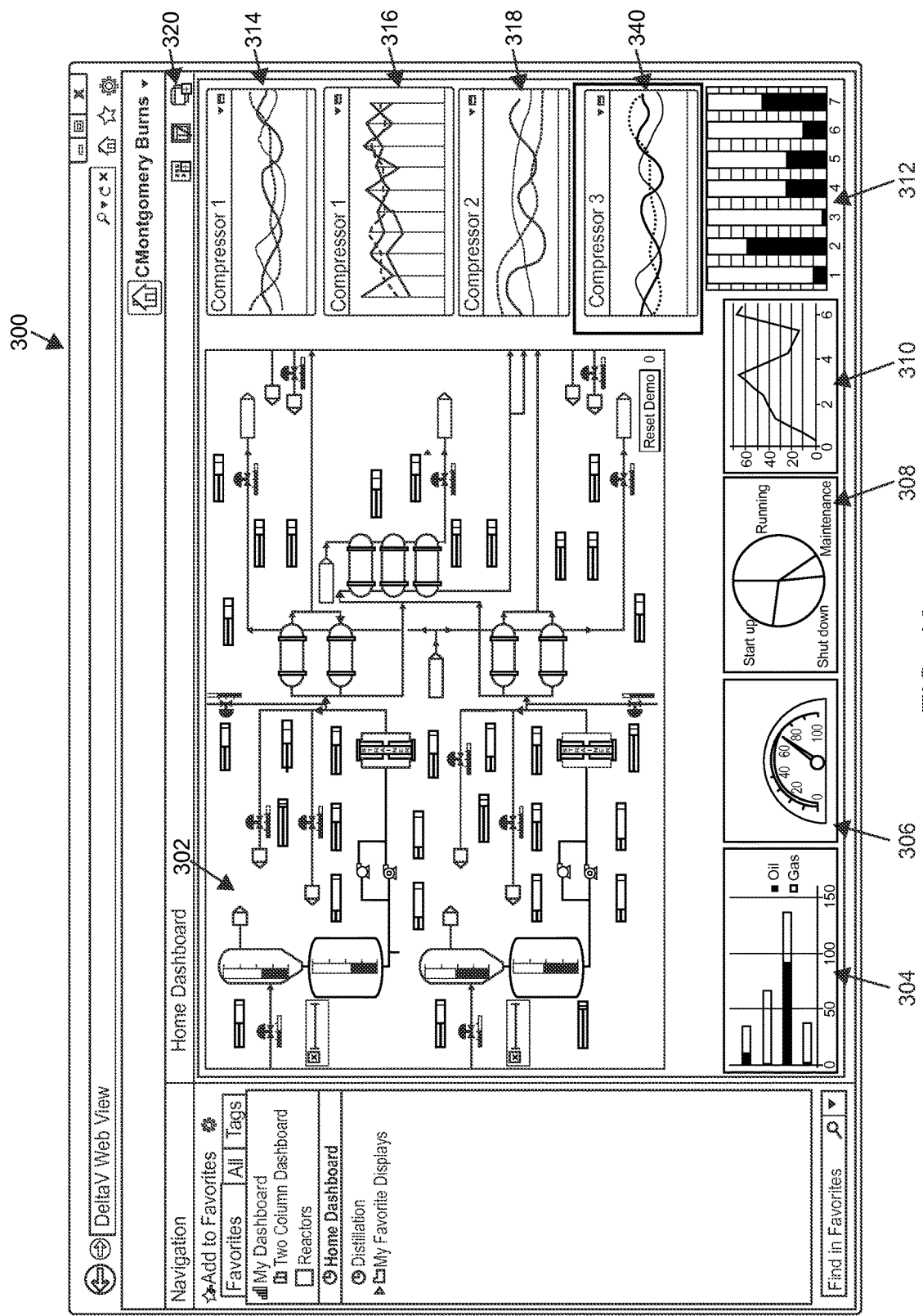

Upon selecting the add button, the gadget configuration logic of the application 20 creates the actual gadget and may begin to execute that gadget in the dashboard 300. As illustrated in FIG. 14, a display window 340 for this gadget is created in a separate window on top of the dashboard view or display 300 and is illustrated or highlighted to the user to enable the user to place the gadget window 340 in the desired location in the dashboard 300. In this case, as illustrated in FIGS. 15 and 16, the user selects or grabs the gadget 340 (using a mouse for example) and moves the gadget 340 over to a position between the gadget 318 and the bar chart 312. The user may then drop the gadget 340 in the desired location and, when doing so, the dashboard generation logic 104 of FIG. 2 places the gadget 340 in that location on the dashboard. In this case, as illustrated in FIG. 16, when the user drops the gadget 340 in the proper location, the dashboard generation logic 104 installs the gadget at that location and may automatically resize the other gadgets to 314 to 318 and reconfigures the dashboard 300 to include four gadgets on the right side of instead of three. Of course, if the user wanted to define new gadget instead of simply selecting a preconfigured one in the library 108, the user could have used the process illustrated or describe above to fill out or fill in configuration fields for the gadget to identify the process variable(s) or other information to be displayed by the gadget and the manner in which that information was be displayed, such as using bar charts, graphs, flow charts, flow diagrams etc.

Figure 17:
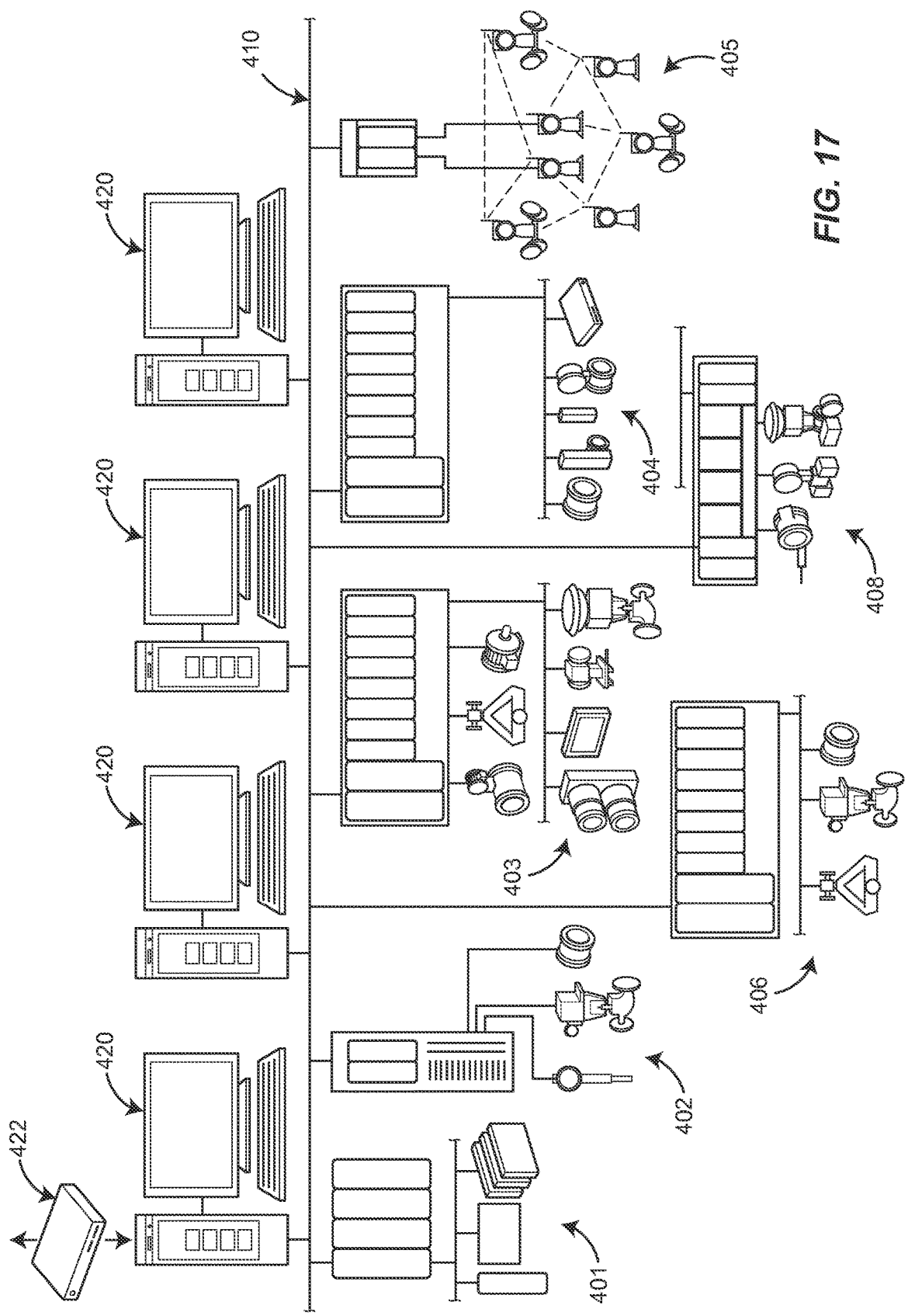
FIG. 17 illustrates the use of a display viewing and configuration application in one or more operator stations in a process plant network.
Figure 18:
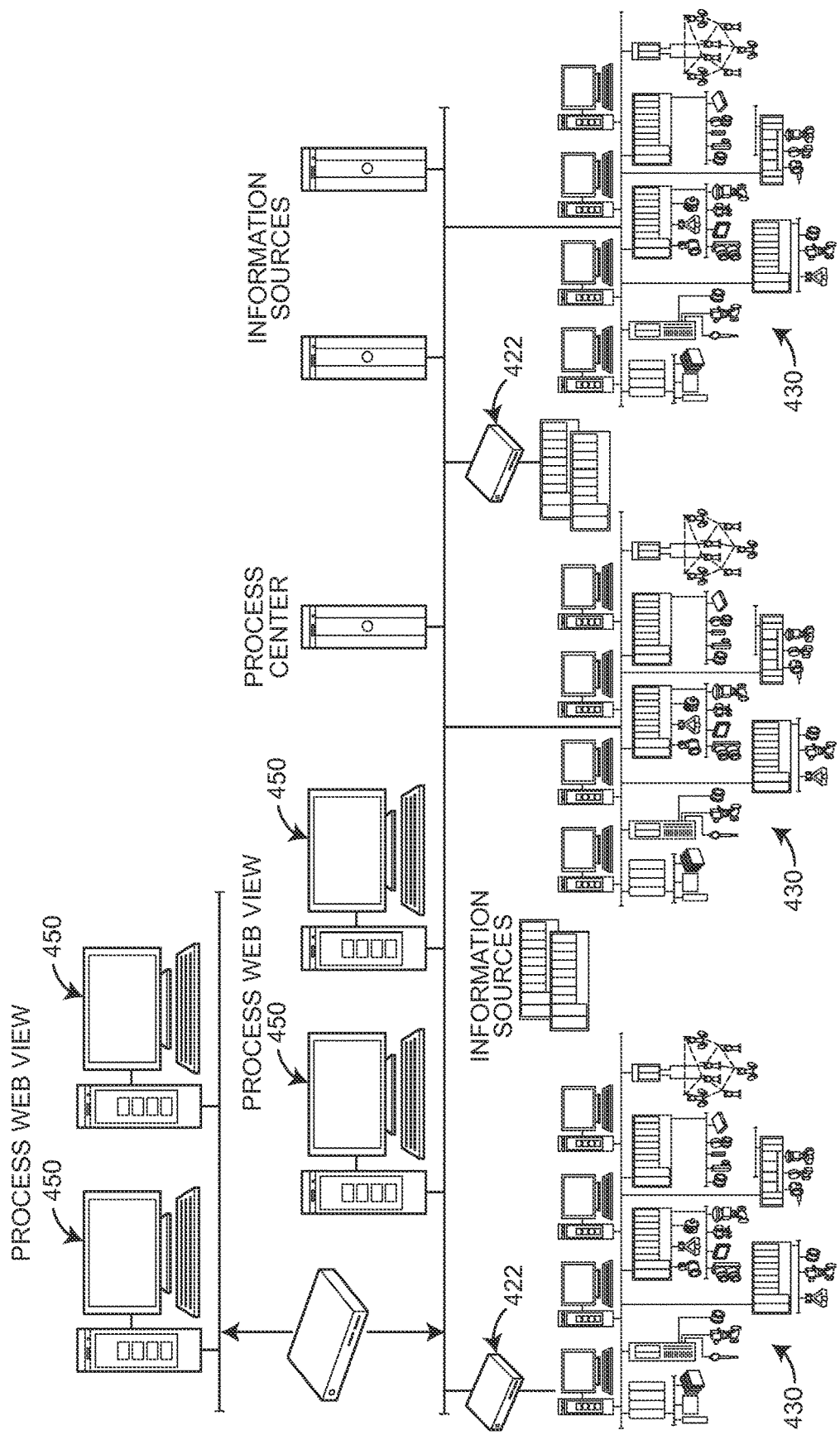
FIG. 18 illustrates the use of a display viewing and configuration application in one or more workstations connected to a plant network via an internet connection.
Figure 19:
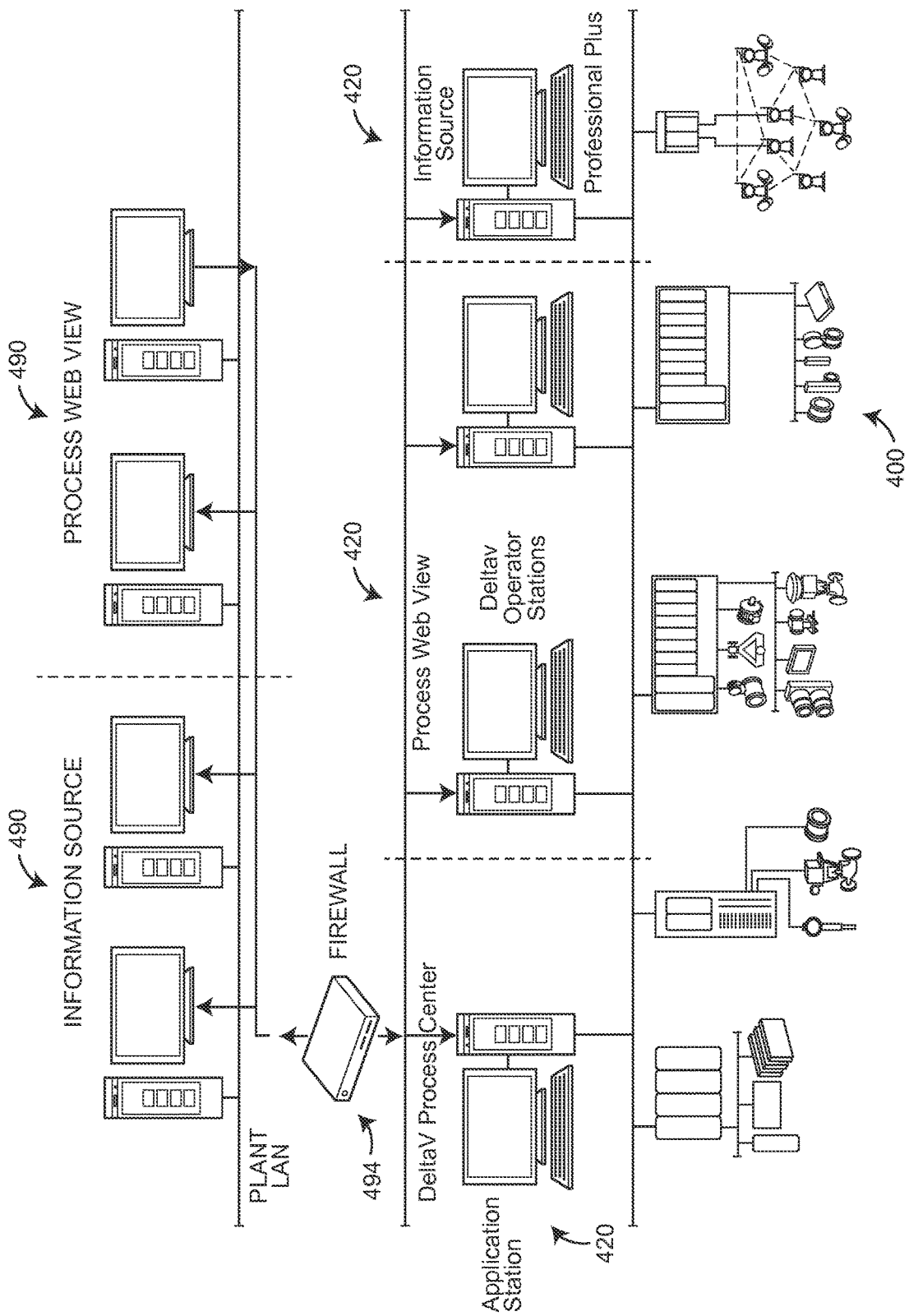
FIG. 19 illustrates the use of a display viewing and configuration application in one or more workstations connected in a local area network to a plant network via a firewall.

FIGS. 17-19 illustrate various locations at which the application 20 can be implemented within a process plant or process control network. In particular, FIG. 17 illustrates a number of control systems 401, 402, 403, 404, 405, 406, and 408 connected to a data highway or bus 410 which is also connected to various operator interfaces 420, each of which may be operator workstations or interfaces in the plant. The control systems 401-408 may be Fieldbus systems, HART, WirelessHART systems, or mixed systems associated with a single plant or multiple different plants. The operator interfaces 420 may implement or execute the applications 20 to perform display and dashboard creation and configuration activities using the techniques described herein. Moreover, each of the display applications 20 may interface with the control networks 401-408 to get data and to provide graphical displays and dashboard editing using, for example, gadgets as described herein. Furthermore, one of the workstations 420 may be connected to a gateway 422 to act as a gateway to external sources of data.

Likewise, FIG. 18 illustrates a set of process control plants 430 that may be connected to the internet via various gateway devices 422, such as the gateway device 422 illustrated in FIG. 17, or directly and that enables plant data to be provided to applications 20 executed in operator devices 450 which are connected together via the internet or other communications network separate from the plant networks 430. In this example, the applications 20 may have portions thereof executed in the devices at or on the plant networks 430 and may simply have a client interface on the devices 450 which act as web clients. In other cases, the applications 20 may execute in the devices 450 and may communicate via the web (internet) and the gateway devices 422 to access sources of information in the plants or the plant networks 430. Thus for example, with the user interfaces 450 of the FIG. 18, the various control networks 430 send data through the gateway devices 422 to the various web-enabled displays executed on the computer or display devices 450 which are connected to the internet.

Likewise, FIG. 19 illustrates an example network in which the applications 20 may be executed in various operator or other computer devices or workstations 420 in a plant network as well as in various computer devices or workstations 490 in a local area network (LAN) connected to the plant network via a firewall device 494. Of course, in these configurations, the applications 20 may perform the same functionality as described herein and communicate through the various networks in known manners to provide display and dashboards to users as well as to allow those users to configure or create dashboards using gadgets as described herein. Of course, the same operational interface may be made available in either a rich desktop or a web interface in the systems of FIGS. 17-19.

Figure 20:
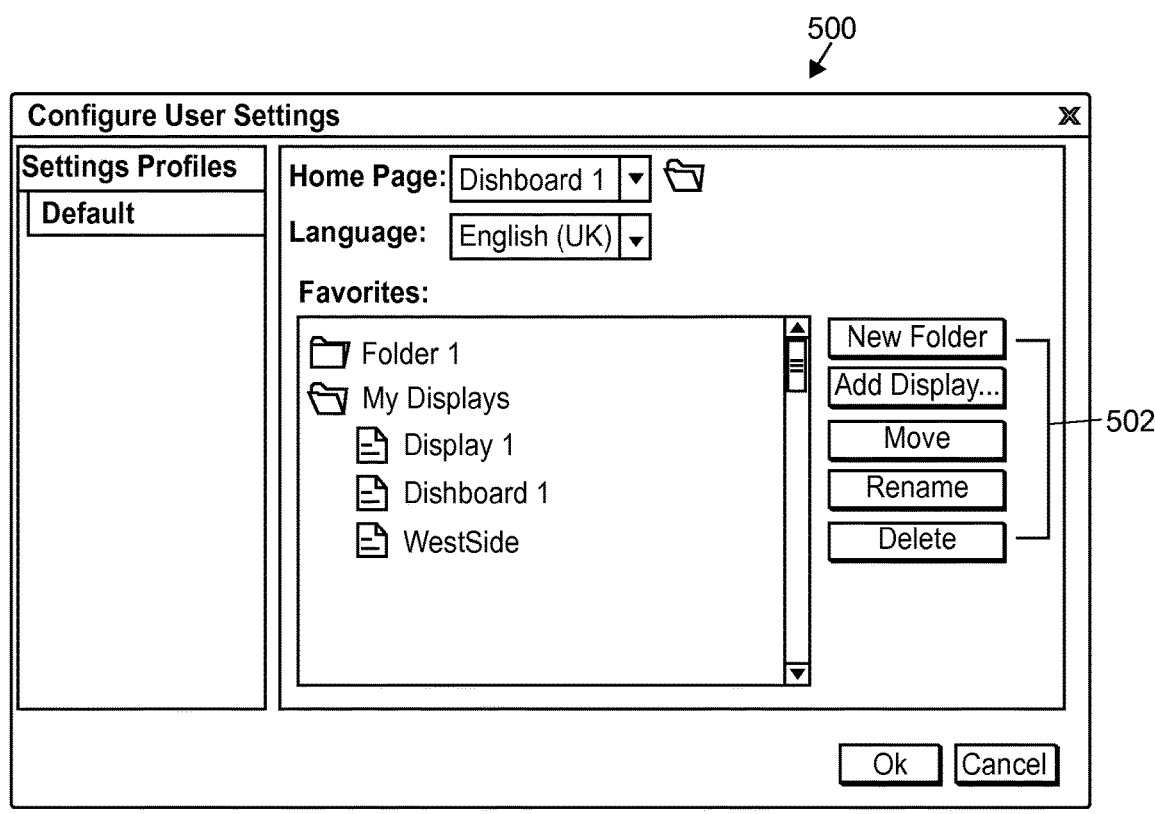
FIG. 20 illustrates file sharing and file manipulation screen that may be used by a user or administrator to configure display files viewable by a user.

FIG. 20 illustrates a window 500 which may be provided by the application 20 to enable a user to configure user settings, such as placement of dashboards and displays within a user folder, which may allow the user to add displays (or dashboards), move displays (or dashboards), rename displays (or dashboards), delete displays (or dashboards) or move displays (or dashboards) in folders. Of course, using the window 500 of FIG. 20, the user may select a listed display and may use the controls 502 to perform functions on the selected displays or the folders.

Figure 21:
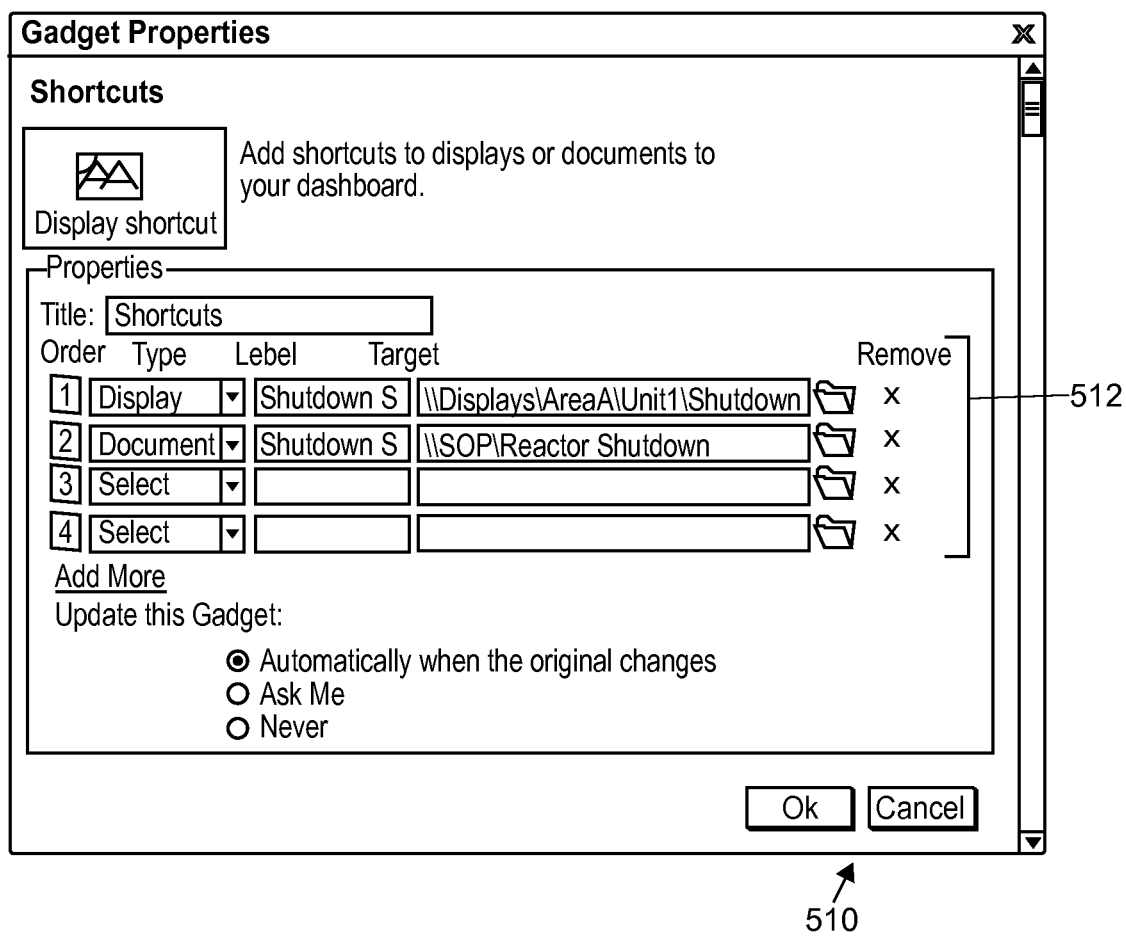
FIG. 21 illustrates a dashboard configuration screen that may be used to specify links or shortcuts between various dashboard displays and other documents or sources of information.

FIG. 21 illustrates a gadgets property dialog box 510 which may be used or provide by the application 20 to configure or view gadget properties, or to set up shortcuts to other displays in a dashboard. In this case, the user may use the input boxes 512 to indicate the display links for the shortcuts to these displays or to other documents or information in the plant in a particular dashboard being created.

As will be understood, the display and dashboard creation and modification techniques described herein can be used to enable user to create dashboards easily, without having special expertise with graphic design programs, and without needing to have a deep knowledge of database path names and data locations. These techniques also allow quick navigation to and between displays to enable user to become proficient without requiring formal training.

In one example, the display applications 20 may be implemented as a rich client desktop application that may work like a web browser to provide browsing of process graphics instead of browsing of web sites, with tools to simplify the navigation of displays (e.g. favorites, search, hierarchical navigation with key strokes, etc.). Thus, conceptually, all of the displays viewable in or through the application 20 behave as web pages, with unique URLs. Functions that users are accustomed to with Internet Explorer may be supported.

Still further, in one implementation, a computing environment for developing control logic for a process control and/or monitoring system automatically provides role-dependent views or displays to engineers and other users. In particular, the computing environment may filter and organize engineering tools and information according to the role of the user in the corresponding organization, e.g., a production manager, a maintenance manager, a control system engineer, an electrical and instrument engineer, etc. The computing environment then may provide the filtered information and tool selection to the user in a view or display that includes, for example, a certain user interface screen, several generations of user interface screens, a set of related user interface screen displayed simultaneously, etc. Thus, two users having different organization roles may see different selections and/or arrangements of software applications, libraries, assets, data trees, etc. upon logging in. If desired, these applications may include different system displays and dashboards based on the user role. Further, as these users make selections and invoke functions within the respective views, the computing environment may continue to filter and organize information according to the users' roles. As a result, users can find relevant information more easily and more quickly.

A role-dependent view may include any suitable number of user interface screens with such information as, for example, (i) a visualization including a process display, a dashboard, various faceplates, machine views, etc., (ii) a logic display depicting control modules, phases, recipes, calculations, functions, etc., (iii) an instructions or "knowledge" display including standard operating procedures, device manuals, material handling nodes, loop diagrams, etc., (iv) a business information display illustrating orders, equipment tracking, material consumption, electrical consumption, etc., (v) a system health display including equipment status data, device alerts, vibration data, etc., and (vi) input/output devices. As one example, when a control system engineer logs in, the computing environment may generate process displays and dashboards as part of visualizations, control modules, phase, calculations, and functions as part of logic displays, loop diagrams as part of knowledge displays, etc. On the other hand, when an electrical and instrument engineer logs in, the computing environment may generate device dashboards as part of visualizations, calculations as part of logic, and device manuals as part of knowledge displays. When a role-dependent view includes multiple screens, navigation between the screens also may be role-dependent. Thus, for example, if the computing environment displays equipment status to both process control engineers and electrical and instrumentation engineers, the computing environment may provide a link (e.g., a button in the toolbar, an option in a pull-down menu, an icon displayed next to a unit of equipment) to an electrical and instrumentation engineer to directly navigate to equipment tracking, and not provide this link to a process control engineer.

In a sense, the computing environment organizes functions and data into layers. Mapping of layers to a user-dependent view may be specific to a software application or the entire computing environment, if desired. In an example implementation, the computing environment retrieves the user's role from a database, identifies layers of information mapped to the user's role for the selected software application using a respective configuration file, and generates a role-dependent view. Because roles within an organization can be defined at any desired number of levels, the computing environment may overlay multiple layers of functions and data to generate a certain view. For example, the role for a maintenance manager may correspond to multiple sub-roles depending on the area of technology for which the maintenance manager is responsible. In general, role definitions can include any number of tiers. A user may be allowed to further configure his or her view and, in some cases, may override the mapping of layers to his or her role-dependent view.

More generally, the computing environment can provide role-dependent views to all personnel involved in configuring, operating, supervising, etc., a process control environment. One such role may be that of an operator responsible for supervising process parameters such as flow, level, temperature, pressure, etc., monitoring events related to process control loops, and generally assuring accuracy of control logic implemented in the process plant. Another role may that of a maintenance technician responsible for monitoring and calibrating individual field devices, and generally supervising equipment used in the process control plant. Yet another role may be that of a network administrator responsible for network connectivity between workstations, controllers, data servers, databases, and other network devices, security of the plant network, installation of software updates, etc. As a more specific example, an operator interface allows operators to supervise the operation of a process plant, in which multiple field devices execute process control functions defining a control strategy. A computing environment that provides role-dependent operator views may generate views with information specific to operators' roles rather than providing a generic operator view at an operator workstation. The computing environment may use displays and dashboards generated in the manner described above to perform this task. To this end, the computing environment may ask that an operator log in or otherwise identify his role. In addition to providing role-specific layer controls and information to an operator, the computing environment may support persistent (i.e., surviving across log-in sessions) user-specific configuration.

A role-dependent operator view may generate a graphical representation of a process plant (the "process graphic") and display additional information for a selected portion of the process plant according to the operator's role. The process graphic can include, for example, graphic or schematic depictions of field devices (e.g., valves, pumps, sensors, transmitters) that participate in the corresponding process control function, equipment on which these field devices operate (e.g., tanks, mixers), connections for conducting process fluids between the field devices and the equipment (e.g., pipes), and electrical connections between the field devices (e.g., wires, wireless links). The user interface may display the additional information on a supplemental display implemented, for example, as one or several separate windows, a graphic layer superimposed on the process graphic, or text and/or graphics on a banner disposed below, above, or next to the process graphic.

In some scenarios, the operator selects a location on the process graphic and activates a control on the user interface such as a button, for example, to request the supplemental display from the user interface. In other scenarios, the user interface automatically activates the supplemental display in response to detecting an abnormal condition, according to a pre-configured schedule, or based on another event. The user interface may interpret the location which the user selects according to the user's organizational role. Thus, by clicking on a location at or near a graphic illustrating a flow rate sensor, a maintenance technician can select the physical device (i.e., the flow rate sensor), whereas an operator can select a control loop in which the flow rate sensor operates.

For an operator, the supplemental display (or "the operator supplemental display") may include a configuration display that depicts control logic implemented by a certain portion of the process plant as several interconnected logic blocks, for example. In some cases, the logic blocks are Foundation™ Fieldbus function blocks. The operator supplemental display may also include a parameter history display to illustrate the history of a certain process parameter (e.g., flow rate at an input to a certain processing stage). Further, the operator supplemental display may include a knowledge display that lists links to internal and external documentation available for the portion of the process plant, provides access to operator logbooks, suggests help topics, etc. Still further, the operator supplemental display may include a device dependencies display that lists identifies of the field devices used in the portion of the process plant to which the process graphic corresponds. The device dependencies display may retrieve device-specific graphics from a configuration database to display next to each identifier of a field device. If desired, the operator supplemental display may additionally include a detail display that provides detailed information related to devices used in the portion of the process plant to which the process graphic corresponds, interlocks associated with these devices and the corresponding interlock conditions, alarms generated for the portion of the process plant, tuning parameters, etc.

As yet another example, when the user is a maintenance technician or is otherwise associated with maintenance personnel, the supplemental display (or "the maintenance supplemental display") may include a control dependencies display for a selected device that identifies a portion of the control strategy (e.g., a control loop) in which the device operates. The maintenance supplemental display may also include a knowledge display generally similar to the knowledge display generated for the operator. In particular, the knowledge display may list links to internal and external documentation available for the device, as well as links to operator logbooks, help topics, etc. Further, the maintenance supplemental display may include a diagnostic display to assist the maintenance technician with locating the physical device in the process plant, identifying the source of an alarm, and determining the relationship between the device and other equipment. The diagnostic display may, for example, depict a Fieldbus segment along with the several devices coupled to the Fieldbus segment, and identify the device from which an alarm has been received by highlighting the corresponding graphic, displaying an exclamation mark or other visual indicator next to the device, or in any other suitable manner. Still further, the maintenance supplemental display may include a device description display that includes, in some implementations, the device identification consistent the Extended Device Description Language (EDDL), device configuration and setup data, and device diagnostics data. In some cases, the device description display includes a so-called device faceplate implemented as a photograph or a drawing identical or similar to the actual physical appearance of the device and, if desired, several dials or meters to depict process data specific to the device (e.g., pressure setpoints, pressure measurement, percentage of valve movement). When the device is an intelligent valve executing corresponding valve software (e.g., AMS ValveLink application offered by Emerson Process Management™ as part of the PlantWeb® suite), the maintenance supplemental display may additionally include a valve software display updated with data output by the valve software.

The computing environment may include a display generator with a primary display generator and a supplemental display generator. The primary display generator displays, on a user interface, a process graphic defined by a configuration engineer, for example, and the supplemental generator dynamically selects and displays additional information in response to detecting an event in the process plant or receiving a command from the user interface. The display generator interacts with at least some of a process plant via a process plant interface to obtain real-time process data, a configuration database to obtain control strategy information such as control logic, device configuration data, process and device graphics, links between control strategies and devices, etc., one or several specialized applications to obtain application data, a historian to receive historical data related to process or device parameters, and a knowledge database to receive reference information.

In some cases, the display generator operates with display structures that define several layers such as an operator layer, a maintenance layer, a network layer, etc. The display generator may update information related to each layer using real-time process data irrespective of the organizational role of the user, but activates the display of only the selected one or several layers according to the currently selected view (e.g., operator, maintenance).

A process graphic may be developed using objects that include a graphical component and an interface to one or several physical devices to update the graphical component in real-time. Some of the objects may be dedicated to control strategies (e.g., a PID loop object), while some of the objects may be dedicated to devices (e.g., a temperature sensor object). The user interface filters data received by the objects from the process plant to display information relevant to the user's organizational role. Alternatively, a process graphic can be developed using hardcoded references to devices. When generating the supplemental display, the user interface may retrieve configuration data that specifies relationships between control strategies and devices from one or several configuration databases, and automatically generate the operator supplemental display, the maintenance supplement display, or another supplemental display specific to a user role using the retrieved information.

The supplemental display may be user-configurable using the dashboard and gadget techniques described herein, for example, so that an individual user can specify what information should be included in the corresponding supplemental display and at what location. In some embodiments, the computing environment automatically switches an operator supplemental display to a maintenance supplemental display, or vice versa, in response to a command received from the user interface.

When implemented in software, any of the display and dashboard configuration applications described herein may be stored in any computer readable memory such as on a magnetic disk, a laser disk, or other storage medium, in a RAM or ROM of a computer or processor, etc. Likewise, this software or these modules may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A user display configuration system for a process plant, comprising:
a tangible non-transitory computer readable medium that stores:
a first library that includes one or more executable graphical elements, each of the one or more executable graphical elements including (i) informational indicia, and (ii) one or more links to data related to the informational indicia within a process control system such that the informational indicia is displayed with respectively linked data in accordance with the one or more links; and
a second library that includes one or more executable user interface display forms, at least one of the executable user interface display forms defining a display region for a user display device, the display region comprising one or more non-modifiable regions and one or more modifiable sub-regions, the one or more modifiable sub-regions operable to receive the one or more executable graphical elements of the first library; and
one or more processors configured to execute a display application that:
receives user input to configure the one or more executable user interface display forms and the one of the executable graphical elements by (i) specifying a location of at least one of the modifiable sub-regions within the display region of the one of the executable user interface display forms, and (ii) specifying the one or more links to data within the process control system used by the one of the executable graphical elements, and
creates a link between the one of the executable graphical elements and the one of the modifiable sub-regions of the one of the executable user interface display forms upon a user specifying the link by dragging and dropping an indication of the one of the executable graphical display elements to a region on a user display associated with the one of the modifiable sub-regions of the one of the executable user interface display forms,
wherein, upon configuring the one of the executable user interface display forms in accordance with an initial configuration, at least one of the one or more modifiable sub-regions is selectively associated with a first executable graphical element that is used to present information within the display region,
wherein each of the one or more executable user interface display forms includes a link between each of the one or more of the modifiable sub-regions of a respective executable user interface form and an executable graphical element, and
wherein, during runtime execution of the one of the executable user interface display forms via the display application and in response to a user selection, the initial configuration of the one of the executable user interface display forms is modified such that the at least one of the one or more modifiable sub-regions is then (i) occupied by a second executable graphical element that is different than the first executable graphical element, or (ii) no longer occupied by an executable graphical element.

2. The user display configuration system of claim 1, wherein the one or more processors are further configured to, upon execution of the display application, receive a user input from a user specifying a link between (i) one of the modifiable sub-regions of the one of the executable user interface display forms and (ii) one of the executable graphical display elements, to cause the one of the executable graphical display elements to, upon execution thereof, display information in the one of the modifiable sub-regions of the one of the executable user interface display forms.

3. The user display configuration system of claim 1, wherein the one or more processors are further configured to, upon execution of the display application, to receive a user input from a user specifying the number of modifiable sub-regions associated with the display region of the one of the executable user interface display forms.

4. The user display configuration system of claim 1, wherein the one or more processors are further configured to, upon execution of the display application, to receive a user input from a user specifying the size of at least one of the modifiable sub-regions within the display region of the one of the executable user interface display forms.

5. The user display configuration system of claim 1, wherein the one or more processors are further configured to, upon execution of the display application, to receive a user input from a user to configure the one of the executable graphical elements by specifying the informational indicia used by the one of the executable graphical elements.

6. The user display configuration system of claim 1, wherein the configuration system associates one or more of the executable graphical elements with one of the modifiable sub-regions so that a visual display created by the one or more executable graphical elements is automatically sized to fit within the one of the modifiable sub-regions.

7. The user display configuration system of claim 1, wherein the one or more processors are further configured to, upon execution of the display application, to store an executable user interface display form that has been configured by a user in the second library as a new executable user interface form.

8. The user display configuration system of claim 7, wherein the one or more processors are further configured to, upon execution of the display application, to store the executable user interface display form that has been configured by a user in the second library associated with the user to present the executable user interface display form that has been configured by the user in one or more user folders associated with the user.

9. The user display configuration system of claim 7, wherein the one or more processors are further configured to, upon execution of the display application, to store the executable user interface display form that has been configured by the user in the second library associated with multiple different users, to present the executable user interface display form that has been configured by the user to multiple different users in one or more folders accessible by the multiple different users.

10. The user display configuration system of claim 7, wherein the one or more processors are further configured to, upon execution of the display application, to store the executable user interface display form that has been configured by the user in the second library as an executable user interface display form that is configurable by other users.

11. The user display configuration system of claim 7, wherein the one or more processors are further configured to, upon execution of the display application, to store the executable user interface display form that has been configured by the user in the second library as an executable user interface display form as a system display that is not configurable by other users.

12. A user display system for use in a process plant that includes process control devices connected to control a process, comprising:
   a user interface device including a processor;
   a tangible non-transitory computer readable medium storing:
      a first library database that includes one or more executable graphical elements, each of the one or more executable graphical elements including (i) informational indicia, and (ii) one or more links to data related to the informational indicia within a process control system such that the informational indicia is displayed with respectively linked data in accordance with the one or more links; and
      a second library database that includes one or more executable user interface displays forms, at least one of the one or more executable user interface display forms defining a display region for a user display device, the display region comprising one or more non-modifiable regions and one or more modifiable sub-regions, the one or more modifiable sub-regions operable to receive the one or more executable graphical elements of the first library; and
   a user display engine that executes on a processor communicatively coupled to (i) the user interface device, (ii) the first and second libraries, and (iii) one or more of the process control devices, the user display engine being configured to:
      receive user input to configure the one or more executable user interface display forms and the one of the executable graphical elements by (i) specifying a location of at least one of the modifiable sub-regions within the display region of the one of the executable user interface display forms, and (ii) specifying the one or more links to data within the process control system used by the one of the executable graphical elements, and
      create a link between the one of the executable graphical elements and the one of the modifiable sub-regions of the one of the executable user interface display forms upon a user specifying the link by dragging and dropping an indication of the one of the executable graphical display elements to a region on a user display associated with the one of the modifiable sub-regions of the one of the executable user interface display forms,
   wherein, upon configuring the one of the executable user interface display forms in accordance with an initial configuration, at least one of the one or more modifiable sub-regions is selectively associated with a first executable graphical element that is to be used to present information within the display region,
   wherein each of the one or more executable user interface display forms includes a link between each of the one or more of the modifiable sub-regions of a respective executable user interface form and an executable graphical element, and
   wherein, during runtime execution of the one of the executable user interface display forms via the user display engine and in response to a user selection, the initial configuration of the one of the executable user interface display form is modified such that the at least one of the one or more modifiable sub-regions is then (i) occupied by a second executable graphical element that is different than the first executable graphical element, or (ii) no longer occupied by an executable graphical element.

13. The user display system of claim 12, wherein the user display engine is further configured to, during runtime execution of the one of the executable user interface display forms, to receive a user input from a user to specify a link between (i) one of the modifiable sub-regions of the one of the executable user interface display forms and (ii) one of the executable graphical display elements, the link indicating the one of the executable graphical display elements that executes to display information in the one of the modifiable sub-regions of the one of the executable user interface display forms.

14. The user display system of claim 12, wherein the user display engine is further configured to, during runtime execution of the one of the executable user interface display forms, to receive a user input from a user specifying the number of modifiable sub-regions associated with the display region of the one of the executable user interface display forms.

15. The user display system of claim 12, wherein the user display engine is further configured to, during runtime execution of the one of the executable user interface display forms, to receive a user input from a user to configure the one of the executable graphical elements by specifying the informational indicia to be used by one of the executable graphical elements.

16. The user display system of claim 12, wherein the user display engine is further configured to, during runtime execution of the one of the executable user interface display forms, to implement one or more of the executable graphical elements within one of the modifiable sub-regions of the one of the executable interface user interface display forms so that a visual display created by the one or more executable graphical elements is automatically sized to fit within the one of the modifiable sub-regions of the one of the executable user interface display forms when the one of the executable display forms is executed by the user display engine.

17. The user display system of claim 12, wherein the user display engine stores an executable user interface display form, that has been configured by a user, in the second library database associated with the user to present the executable user interface display form that has been configured by the user in one or more user folders associated with the user.

18. The user display system of claim 12, wherein the user display engine stores the executable user interface display form, that has been configured by the user, in the second library database associated with multiple different users, to present the executable user interface display form that has been configured by the user in one or more folders accessible by the multiple different users.

19. The user display system of claim 12, wherein the user display engine stores the executable user interface display form, that has been configured by the user, in the second library database associated with a task, to present the executable user interface display form that has been configured by the user in one or more folders associated with the task.

20. The user display system of claim 12, wherein the user display engine stores the executable user interface display form, that has been configured by the user, in the second library database associated with particular process control devices, to present the executable user interface display form that has been configured by the user in one or more folders associated with the particular process control devices.

21. The user display system of claim 12, wherein the user display engine is executed in a computer device communicatively connected to the user interface device.

22. The user display system of claim 21, wherein the user display engine is executed in a computer device included as part of a first communication network, the first communication network being communicatively connected to a second communication network including the user interface device via a firewall device coupled between the first communication network and the second communication network.

23. The user display system of claim 21, wherein the user display engine is executed in a computer device communicatively connected to the user interface device via a communication network and communicates with the user interface device via a web browser.

24. The user display system of claim 12, wherein the user display engine is executed on the processor of the user interface device.

25. The user display system of claim 12, wherein the user display engine receives a user input from a user to change the operation of the process control devices via interaction with the one of the executable user interface display forms during runtime execution of the one of the executable user interface display forms to affect a product produced by the process control devices.

26. The user display system of claim 25, wherein the one of the executable user interface display forms includes a fixed region in the display region not associated with any executable graphical elements, and
   wherein the executable user interface display form includes (i) fixed informational indicia, and (ii) fixed links to process data generated by the process control devices within the process plant that are presented in the fixed display region during runtime execution of the one of the executable user interface display forms.

27. The user display system of claim 26, wherein the fixed informational indicia includes a piping and instrument diagram for a portion of the process plant.

28. The user display configuration system of claim 1, wherein the informational indicia provides data regarding a real-time operation of the process plant during runtime of the process plant.

29. The user display configuration system of claim 7, wherein upon execution of the display application and receipt of a user input, the one or more processors are further configured to replace the presentation of the one of the executable user interface display forms with the new executable user interface form during runtime of the process plant.

30. The user display system of claim 12, wherein the informational indicia provides data regarding a real-time operation of the process plant during runtime of the process plant.

31. The user display system of claim 7, wherein the user display engine is further configured to:
   upon receipt of a first user input, store an executable user interface display form that has been configured by a user in the second library database as a new executable user interface form, and
   upon receipt of a second user input, replace the presentation of the one of the executable user interface display forms with the new executable user interface form during runtime of the process plant.

32. The user display configuration system of claim 1, wherein the alteration of the configuration of the one of the one or more executable user interface display forms results in informational indicia being updated to reflect changes about the process control system.

33. The user display configuration system of claim 1, wherein upon execution of the one of the executable user interface display forms via the display application, the one or more processors further cause, in response to another user selection associated with one of the one or more executable graphical elements, user-selected links from among the one or more links to data within the process control system to be stored in the first library that are to be used by the one of the one or more executable graphical elements during runtime of the process plant, such that the same one of the one or more executable graphical elements displays different informational indicia based upon different user-selected links.

34. The user display configuration system of claim 33, wherein:
   the first library is further configured to store one or more forms that specify the one or more links that connect data related to informational indicia within the process control system for each of the one or more executable graphical elements, and
   upon runtime execution of the one of the executable user interface display forms via the display application, the one or more processors cause one or more links associated with the selected form to be stored in the first library as the user-selected links that are to be used by the one of the executable graphical elements during runtime of the process plant.

35. The user display configuration system of claim 1, wherein each of the one or more modifiable sub-regions is selectively associated with a different executable graphical element from among the one or more executable graphical elements, each of the different executable graphical elements concurrently presenting different types of respective information.

36. The user display configuration system of claim 12, wherein the alteration of the configuration of the one of the one or more executable user interface display forms results in informational indicia being updated to reflect changes about the process control system.

37. The user display system of claim 12, wherein upon runtime execution of the one of the executable user interface display forms, the one or more processors further cause, in response to another user selection associated with one of the one or more executable graphical elements, user-selected links from among the one or more links to data within the process control system to be stored in the first library that are to be used by the one of the executable graphical elements during runtime of the process plant, such that the same one of the one or more executable graphical elements displays different informational indicia based upon different user-selected links.

38. The user display system of claim 37, wherein:
the first library is further configured to store one or more forms that specify the one or more links that connect data related to informational indicia within the process control system for each of the one or more executable graphical elements,
upon runtime execution of the one of the executable user interface display forms, the one or more processors cause one or more links associated with the selected form to be stored in the first library as the user-selected links that are to be used by the one of the executable graphical elements during runtime of the process plant.

39. The user display system of claim 12, wherein each of the one or more modifiable sub-regions is selectively associated with a different executable graphical element from among the one or more executable graphical elements, each of the different executable graphical elements concurrently presenting different types of respective information.

* * * * *